Patented July 16, 1974

3,824,260
NOVEL PREGNANOIC ACID DERIVATIVES
Henry Laurent, Rudolf Wiechert, Klaus Prezewowsky, Helmut Hofmeister, Erich Gerhards, Karl Heinz Kolb, and Klaus Mengel, Berlin, Germany, assignors to Schering Aktiengesellschaft, Berlin, Germany
No Drawing. Filed Aug. 30, 1972, Ser. No. 284,710
Claims priority, application Germany, Oct. 1, 1971, P 21 50 268.1; Jan. 27, 1972, P 22 04 358.9, P 22 04 361.4
Int. Cl. C07c *169/36*
U.S. Cl. 260—397.1                    62 Claims

ABSTRACT OF THE DISCLOSURE

Pregnanoic acid derivatives of the formula

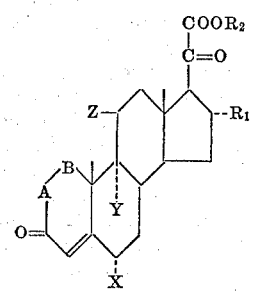

wherein X is hydrogen, halogen, or methyl; Y is hydrogen or halogen; Z is hydroxy or halogen having an atomic weight no greater than Y; $R_1$ is hydrogen or methyl; $R_2$ is hydrogen, alkali metal or saturated or unsaturated hydrocarbon of 1–18 carbon atoms which is unsubstituted or substituted by hydroxy, halo, alkoxy, carboxy, carbalkoxy, amino, alkylamino, dialkylamino, nitro or sulfato, wherein alkyl in each instance contains 1–4 carbon atoms; and —A—B— is —CH=CH—, —CCl=CH— or, when at least one of X, Y and $R_1$ is other than hydrogen, —CH$_2$—CH$_2$; possess pronounced topical anti-inflammatory activity.

BACKGROUND OF THE INVENTION

This invention relates to novel pregnanoic acid derivatives.

One of us, with others, has published the isolation of 6α-fluoro-11β-of-3,20-dioxo-16α - methyl-pregna-1,4-dien-21-acid (Compound I) as a water-soluble metabolite of fluocortolone in humans. E. Gerhards et al., *Acta Endrocrinologica*, 68 (1971) 98–126. The preparation of the ethyl ester thereof for characterization purposes was also reported in that publication.

We have found that these compounds and structurally related compounds as defined hereinafter possess valuable pharmacological activity and that they can be prepared synthetically by the methods described hereinafter.

SUMMARY OF THE INVENTION

In one aspect, this invention relates to novel compounds of the general Formula I

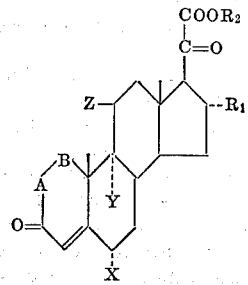

wherein X is a hydrogen atom, a halogen atom, or a methyl group; Y is a hydrogen atom or a halogen atom; Z is a hydroxy group or a halogen atom having an atomic weight no greater than Y; $R_1$ is a hydrogen atom or a methyl group; $R_2$ is a hydrogen atom, and alkali-metal atom, or a hydrocarbon group, which optionally can be substituted; and —A—B— is —CH=CH—, —CCl=CH— or, when at least one of X, Y and $R_1$ is other than a hydrogen atom, —CH$_2$—CH$_2$, with the proviso that $R_1$ is hydrogen when X is fluoro, Y is hydrogen, Z is hydroxy, —A—B— is —CH=CH— and $R_2$ is hydrogen or ethyl.

In another aspect, this invention relates to pharmaceutical compositions, especially pharmaceutical compositions adapted for topical application, comprising one or more of the novel compounds of this invention, or 6α-fluoro-11β-hydroxy-3,20-dioxo-16α-methyl - 1,4 - pregnadien-21-oic acid or the ethyl ester thereof.

In a further aspect, this invention relates to novel processes for the production of these compounds.

In a method of use aspect, this invention relates to the treatment topically of inflammatory conditions.

DETAILED DISCUSSION

Of the compounds of Formula I, preferred sub-classes are those wherein:

Ia. $R_2$ is alkyl of 1–12 carbon atoms, preferably 1–8 carbon atoms;
Ib. X is fluoro, especially those of Ia;
Ic. Y is hydrogen, especially those of Ia and Ib;
Id. Z is hydroxy, especially those of Ia, Ib and Ic;
Ie. —A—B— is —CH=CH—, especially those of Ia, Ib, Ic and Id;
If. $R_1$ is methyl, especially those of Ia, Ib, Ic, Id and Ie. Other preferred sub-classes are those wherein $R_2$ is sodium or potassium when $R_2$ is alkali-metal, or alkyl of 1–4 carbon atoms when $R_2$ is alkyl; and Y and Z are both chloro or Y is fluoro and Z is hydroxy.

Because activity resides in the pregnanoic acid steroidal structure, esters of the free acid also possess the utility of the free acid and its salts. Thus, —COOR$_2$ can also represent an ester group.

For example, $R_2$ can be any hydrocarbon group of 1–18, preferably 1–12, carbon atoms. The hydrocarbon group can be aliphatic, e.g., alkyl, or cycloaliphatic, preferably monocyclic, and can be saturated or unsaturated, substituted or unsubstituted; aryl; aralkyl; or alkaryl.

Examples of saturated aliphatic $R_2$ groups are alkyl of 1–12, preferably 1–8, more preferably 1–4 carbon atoms, e.g., methyl, ethyl, propyl, isopropyl, n-butyl and tert.-butyl. Examples of unsaturated aliphatic are vinyl, allyl, propenyl, propynyl, butenyl and butyryl.

Examples of cycloalkyl are those containing 3–12, preferably 5 or 6 ring carbon atoms, e.g., cyclopropyl, cyclopentyl, cyclohexyl, cyclopentenyl, cyclopentadienyl and p-dicyclohexyl.

Examples of aryl are mono and dicyclic of up to 12 carbon atoms, e.g., phenyl, α-naphthyl and β-naphthyl and p-diphenyl.

Examples of alkaryl are tolyl, xylyl, ethylphenyl and symdiethylphenyl. Examples of aralkyl are benzyl, phenethyl, α-phenylpropyl and diphenylmethyl.

In addition or alternatively to being unsaturated, when $R_2$ is hydrocarbon the hydrocarbon group can bear 1, 2, 3 or more simple substituents, preferably, one, since such substituents ordinarily do not affect the overall activity of the parent pregnanoic acid. Examples of such simple substituents are hydroxy, halo, e.g., Cl or F, NO$_2$, sulfato and alkali-metal salts thereof, amido, lower-alkoxy, i.e., containing 1–4 carbon atoms, e.g., methoxy, ethoxy, propoxy, butoxy and tert.-butoxy group; carboxy, the alkali-metal, e.g., sodium and potassium salts thereof and lower-alkyl esters thereof, e.g., carbomethoxy, carboethoxy; amino groups and the pharmaceutically acceptable acid addition salts thereof, e.g., primary amino, mono- and di-lower-alkylamino, e.g., methylamino, dimethylamino, ethylamino, diethylamino, methyl, ethylamino, propylamino, butylamino and the pharmaceutically acceptable acid addition salts thereof.

The acid addition salts are preferably those of the strong mineral acids, e.g., hydrochlorides, hydrobromides, sulfates and phosphates, and the polybasic or hydroxy acids, e.g., oxalates, maleates, citrates and tartrates and any other pharmaceutically acceptable acid.

Examples of preferred $R_2$ groups are methyl, carboxymethyl, ethyl, 2-hydroxyethyl, 2-methoxyethyl, 2-aminoethyl, 2-dimethylaminoethyl, 2-carboxyethyl, propyl, allyl, cyclopropyl, isopropyl, 3-hydroxypropyl, propynyl, 3-aminopropyl, butyl, sec.-butyl, tert.-butyl, pentyl, isopentyl, tert.-pentyl, 2-methylbutyl, cyclopentyl, hexyl, cyclohexyl, cyclohex-2-enyl, cyclopentylmethyl, heptyl, benzyl, 2-phenylethyl, octyl, bornyl, isobornyl, menthyl, nonyl, decyl, 3-phenylpropyl, 3-phenylprop-2-enyl, dodecyl, tetradecyl, hexadecyl and octadecyl.

According to the process of this invention, the pregnanoic acid derivatives of the general Formula I, including those within the proviso clause, are produced by:

(a) Oxidizing a compound of the general Formula II

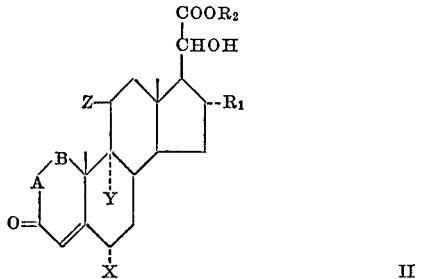

II wherein —A—B—, X, Y, Z, $R_1$, and $R_2$ have the values given for Formula I and the 20-hydroxy group is in the $\alpha$-position or $\beta$-position, or mixture thereof, is oxidized in an inert solvent with manganese (IV) oxide, lead (IV) oxide, or lead (IV) acetate. Optionally thereafter, a thus-produced compound of Formula I is converted to another compound of Formula I, e.g., a $\Delta^4$-steroid is optionally dehydrogenated chemically or microbiologically to a $\Delta^{1,4}$-steroid in a manner known per se; a 2-deschloro-steroid is converted in a conventional manner into a 2-chloro-steroid; a 9$\alpha$-hydrogen steroid is converted in a conventional manner into a 9$\alpha$-halo-, i.e., 9$\alpha$-F, 9$\alpha$-Cl, 9$\alpha$-Br or 9$\alpha$-I, steroid; an ester of general Formula I ($R_2$=hydrocarbon) is saponified; or a free acid of general Formula I ($R_2$H) is esterified; or (b) Converting an ester of the general Formula III

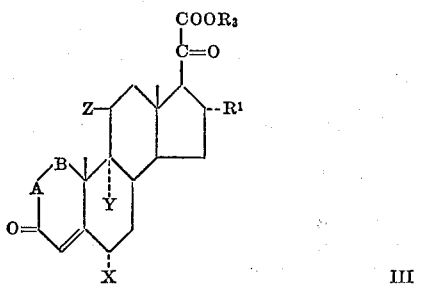

III wherein —A—B—, X, Y, Z, and $R_1$ have the values given in Formula I, and $R_3$ is hydrocarbon group, preferably lower-alkyl, which is different from the $R_2$ group desired in the final product, to a compound of Formula I by transesterification in the presence of a basic catalyst with an alcohol of the formula $R_2$—OH wherein $R_2$ has the value given in Formula I.

The process of this invention according to method (a) can be conducted in an inert solvent customarily employed for oxidations in steroid chemistry. Suitable are hydrocarbons, including cyclohexane, benzene, toluene and xylene; chlorinated hydrocarbons, including methylene chloride, chloroform, carbon tetrachloride, tetrachloroethylene and chlorobenzene; including diethyl ether, diisopropyl ether, dibutyl ether, tetrahydrofuran, dioxane, glycol dimethyl ether and anisole; ketones, including acetone, methyl ethyl ketone, methyl isobutyl ketone and acetophenone; and alcohols, including methanol, ethanol, isopropanol and tert.-butanol; and mixtures of these solvents.

The process of this invention according to method (a) can be conducted using manganese (IV) oxide, lead (IV) oxide or lead (IV) acetate. In order to obtain high yields in this method, active manganese (IV) oxide is preferably employed, as is customary in steroid chemistry in connection with oxidation reactions.

The oxidation according to method (a) is preferably effected at a reaction temperature of between 0° C. and 150° C. Thus, it is possible, for example, to oxidize the compounds of general Formula II at room temperature or at the boiling temperature of the solvent employed.

The configuration of the 20-hydroxy group of the starting compounds of general Formula II is of no significance in the process of this invention. Therefore, both the 20$\alpha$-hydroxy steroids of general Formula II and the 20$\beta$-hydroxy steroids of general Formula II, including mixtures thereof, can be oxidized in the same manner in the process of this invention into the pregnanoic acid derivatives of the general Formula I.

It is surprising that it is possible to oxidize the 20-hydroxy group of the compounds of general Formula II to the 20-keto group with the aforementioned oxidation agents and that, during the oxidation of the 11$\beta$,20-dihydroxy steroids of general Formula II, the 20-hydroxy group can be selectively oxidized.

Following the procedure of method (a), e.g., as described in Example 1 hereinafter, the published compound ethyl ester of 6$\alpha$-fluoro - 11$\beta$ - hydroxy-3,20-diketo-16$\alpha$-methyl-1,4-pregnadiene-21-oic acid is produced by the reaction of 6$\alpha$-fluoro-11$\beta$,21-dihydroxy - 16$\alpha$ - methyl-1,4-pregnadiene-3,20-dione and cuprous acetate in ethanol, followed by oxidation with manganese oxide.

The saponification of the 21-esters of Formula I (R= hydrocarbon) which optionally follows method (a) can be conducted in accordance with conventional techniques, for example, by saponification of the esters in water or an aqueous alcohol in the presence of an acidic catalyst, e.g., hydrochloric acid, sulfuric acid or p-toluenesulfonic acid, or in the presence of a basic catalyst, e.g., potassium bicarbonate, potassium carbonate, sodium hydroxide or potassium hydroxide.

The esterification of the free acids of Formula I ($R_2$=H) which optionally follows method (a) is likewise conducted by conventional techniques. Thus, the free acids can be reacted, for example, with diazomethane or diazoethane, producing the corresponding methyl and ethyl ester, respectively. A generally applicable method is the reaction of the free acids with an alcohol in the presence of carbonyl diimidazole, dicyclohexyl carbodiimide or trifluoroacetic acid anhydride. Also, the acids can be converted to the silver salts thereof and the latter reacted with an alkyl halogenide.

Another method of producing the esters of Formula I is by converting the free acids into the corresponding acid alkyl esters with the corresponding dimethylformamide alkyl acetals. The free acids can also be reacted, in the presence of a strongly acidic catalyst, e.g., hydrogen chloride, sulfuric acid, perchloric acid, trifluoromethylsulfonic acid or p-toluene-sulfonic acid, with an alcohol or with a lower-alkanecarboxylic acid ester of the alcohol selected. The free carboxylic acids can also be converted into their acid chloride or acid anhydride, and to react the latter in the presence of basic catalysts with the alcohols.

The salts of the carboxylic acids of Formula I are produced, for example, during the basic catalyzed saponification of the esters or during the neutralization of the acids employing an alkali carbonate or alkali hydroxide, e.g., sodium carbonate, sodium bicarbonate, sodium hydroxide, potassium carbonate, potassium bicarbonate or potassium hydroxide.

The process of this invention according to method (b) is conducted by reacting the esters of general Formula III with the desired alcohol of the Formula $R_2OH$ in the presence of a preferably anhydrous, basic catalyst.

Preferred basic catalysts employed herein are alkali, alkaline earth and aluminum alcoholates. Method (b) is preferably conducted at a reaction temperature of between 0° C. and 180° C. During this reaction, the alcohol is employed in excess, preferably, 10–1000 mols of alcohol per mol of steroid. The alcohol optionally can be diluted with an inert solvent, e.g., ethers, including di-n-butyl ether, tetrahydrofuran, dioxane and glycol dimethyl ether; or dipolar aprotic solvents, e.g., dimethylformamide, N-methylacetamide, dimethyl sulfoxide, N-methylpyrrolidone and acetonitrile. This variation of the reaction is conducted in such a manner that preferably less than 1 mol of basic catalyst is utilized, per mol of steroid more preferably, 0.0001 to 0.5 mol of basic catalyst per mol of steroid.

As esters of Formula III for the process of method (b) lower alkyl esters are preferably used, e.g., the methyl, ethyl, propyl, isopropyl or butyl ester of the pregnanoic acids.

It is surprising that the esters of Formula III can be reacted with alcohols in the presence of basic catalysts under mild conditions. Method (b) has the advantage that, starting with an ester of pregnanoic acid obtained as the primary product, it is possible to produce in a very simple manner, without previous saponification, a great variety of esters of this pregnanoic acid.

Examples of the compounds which can be prepared in accordance with the process of this invention are:

Acids

11β-hydroxy-3,20-dioxo-1,4-pregnadiene-21-oic acid;
11β-hydroxy-3,20-dioxo-16α-methyl-4-pregnene-21-oic acid;
6α-fluoro-11β-hydroxy-3,20-dioxo-16α-methyl-4-pregnene-21-oic acid;
6α-fluoro-11β-hydroxy-3,20-dioxo-16α-methyl-1,4-pregnadiene-21-oic acid;
11β-hydroxy-3,20-dioxo-6α,16α-dimethyl-1,4-pregnadiene-21-oic acid;
6α,9α-difluoro-11β-hydroxy-3,20-dioxo-16α-methyl-1,4-pregnadiene-21-oic acid;
6α-fluoro-9α-chloro-11β-hydroxy-3,20-dioxo-16α-methyl-1,4-pregnadiene-21-oic acid;
6α-fluoro-2-chloro-11β-hydroxy-3,20-dioxo-16α-methyl-1,4-pregnadiene-21-oic acid;
6α-fluoro-9α,11β-dichloro-3,20-dioxo-16α-methyl-1,4-pregnadiene-21-oic acid;
6α,11β - difluoro - 9α - chloro - 3,20 - dioxo - 16α - methyl-
6α,11β-difluoro-9α-chloro-3,20-dioxo-16α-methyl-1,4-pregnadiene-21-oic acid;

and the sodium and potassium salts and the methyl, ethyl, aminoethyl, 2-methoxyethyl, propyl, propenyl, 3-hydroxypropyl, isopropyl, butyl, isobutyl, sec.-butyl, tert.-butyl, amyl, isoamyl, 2-methylbutyl, cyclopentyl, hexyl, cyclohexyl, heptyl, benzyl menthyl, octyl, and decyl esters of each of these acids.

The compounds of general Formula I possess an antiinflammatory effectiveness upon local application which is often even stronger than the anti-inflammatory effectiveness of the analogous 21-hydroxy steroids and 21-acyloxy steroids.

The anti-inflammatory effectiveness upon local application can be determined on the rat ear according to the method of Tonelli, as follows:

The compound to be tested is dissolved in an irritant consisting of 4 parts of pyridine, 1 part of distilled water, 5 parts of ether, and 10 parts of a 4% strength ethereal croton oil solution. Felt strips attached to the insides of an object-slide pincette are saturated with this testing solution and pressed under a slight pressure for 15 seconds to the right ear of male rats weighing 100–160 g. The left ear remains untreated and serves as comparison. Three hours after application, the animals are sacrificed, and circular sections of a size of 9 mm. are punched out of their ears. The weight difference between the disk of the right ear and that of the left ear is a measure of the thus-formed edema. The dose of test substance is determined at which no edema is formed. From this dose the relative effectiveness of the compounds is determined in comparison to the effectiveness of 6α-fluoro-11β,21-dihydroxy - 16α - methyl - 1,4 - pregnadiene - 3,20 - dione (fluocortolone), as shown in Table I below.

TABLE I.—RAT EAR TEST

| Number | Compound | Relative effectiveness compared to fluocortolone |
|---|---|---|
| I | Methyl ester of 6α-fluoro-11β-hydroxy-3,20-dioxo-16α-methyl-1,4-pregnadiene-21-oic acid. | 0.6 |
| II | Butyl ester of 6α-fluoro-11β-hydroxy-3,20-dioxo-16α-methyl-1,4-pregnadiene-21-oic acid. | 1.3 |
| III | Methyl ester of 6α-fluoro-2-chloro-11β-hydroxy-3,20-dioxo-16α-methyl-1,4-pregnadiene-21-oic acid. | 0.8 |
| IV | Isobutyl ester of 6α-fluoro-9α-chloro-11β-hydroxy-3,20-dioxo-16α-methyl-1,4-pregnadiene-21-oic acid. | 1.2 |
| V | Butyl ester of 6α,11β-difluoro-9α-chloro-11β-hydroxy-3,20-dioxo-16α-methyl-1,4-pregnadiene-21-oic acid. | 1.0 |
| VI | Butyl ester of 6α-fluoro-9α,11β-dichloro-3,20-dioxo-16α-methyl-1,4-pregnadiene-21-oic acid. | 2.0 |

Comparable results are obtained when determining the local antiphlogistic effectiveness on humans in the vasoconstriction test.

On the backs of persons volunteering for the experiment, the stratum corneum was split up by the application and tearing off of an adhesive tape, done twenty times at the same spot, and thus a pronounced hyperemia was produced. Within the stripped area, to marked zones of a size of 4 cm.², respectively 50 mg. of an ointment is applied containing respectively 0.1% or 0.01% of the experimental substance or of the reference substance in a water-oil base. One, two, three and four hours after application, the extent of vasoconstriction is determined. The results of such testing are shown in Table II. In this test, the comparison substance employed is 6α-fluoro-11β,21-dihydroxy - 16α - methyl - 1,4 - pregnadiene - 3,20 - dione- (fluorocortolone). This substance, as is known, is among the most effective anti-inflammatory substances presently available commercially.

TABLE II.—VASOCONTSRICTION TEST

| Number | Compound | Concentration, percent | Observation after (hours) 1 | 2 | 3 | 4 |
|---|---|---|---|---|---|---|
| Comparison | Fluocortolone | 0.1 | 5 | 35 | 65 | 100 |
|  |  | 0.01 | 0 | 20 | 35 | 50 |
| I | Methyl ester of 6α-fluoro-11β-hydroxy-3,20-dioxo-16α-methyl-1,4-pregnadiene-21-oic acid. | 0.1 | 5 | 30 | 60 | 80 |
|  |  | 0.01 | 0 | 20 | 30 | 40 |
| II | Butyl ester of 6α-fluoro-11β-hydroxy-3,20-dioxo-16α-methyl-1,4-pregnadiene-21-oic acid. | 0.1 | 10 | 40 | 85 | 100 |
|  |  | 0.01 | 10 | 40 | 75 | 80 |

Moreover, the compounds of general Formula I surprisingly exhibit properties which have never heretofore been observed in corticoids of anti-inflammatory effectiveness according to the known state of the art. It has been found that the tested compounds are entirely lacking in systemic activity, as demonstrated by the pharmacological investigations described below:

SPF rats [specific-pathogen free rats] weighing 130–150 g. are injected in the right hind paw, for producing a center of inflammation, with 0.1 ml. of a 0.5% *Mycobacterium butyricum* suspension (obtainable from the U.S. company Difco). Prior to injection, the paw volume of the rats is measured. Twenty-four hours after the injection, the paw volume is measured once again to determine the extent of the edema. Thereafter, the selected amount of the test compound, dissolved in a mixture of 29% benzyl benzoate and 71% castor oil, is subcutaneously administered to the rats by injection. After another 24 hours, the paw volume is again determined.

The control animals are treated in the same manner, except that they are injected with a benzyl benzoate-castor oil mixture in the absence of any test compound.

From the paw volumes determined, the edema-inhibitory effect, expressed as a percentage, is calculated in the usual manner.

In these experiments, the comparison substance employed is the conventional compound 6α-fluoro-11β,21-dihydroxy - 16α - methyl - 1,4 - pregnadiene - 3,20 - dione. This compound, at a dose of 1.0 mg. per kg. of body weight, effects an edema-inhibitory activity of about 40%. For example, when conducting these experiments with 0.3 mg., 1.0 mg., 3.0 mg., or 10 mg. per kg. of body weight of the following compounds:

methyl ester of 6α-fluoro-11β-hydroxy-3,20-dioxo-16α-methyl-1,4-pregnadiene-21-oic acid;
butyl ester of 6α-fluoro-11β-hydroxy-3,20-dioxo-16α-methyl-1,4-pregnadiene-21-oic acid;
methyl ester of 6α-fluoro-2-chloro-11β-hydroxy-3,20-dioxo-16α-methyl-1,4-pregnadiene-21-oic acid;
cyclohexyl ester of 6α-fluoro-11β-hydroxy-3,20-dioxo-16α-methyl-1,4-pregnadiene-21-oic acid;
methyl ester of 6α,9α-difluoro-11β-hydroxy-3,20-dioxo-16α-methyl-1,4-pregnadiene-21-oic acid;
ethyl ester of 6α,9α-difluoro-11β-hydroxy-3,20-dioxo-16α-methyl-1,4-pregnadiene-21-oic acid;
methyl ester of 6α-fluoro-9α-chloro-11β-hydroxy-3,20-dioxo-16α-methyl-1,4-pregnadiene-21-oic acid; or
isobutyl ester of 6α-fluoro-9α-chloro-11β-hydroxy-3,20-dioxo-16α-methyl-1,4-pregnadiene-21-oic acid, a 0% edema-inhibitory effect is obtained in each case. In other words, these compounds possess no anti-inflammatory effectiveness systemically.

In order to determine their thymolytic effect, SPF rats weighing 70–110 g. are adrenalectomized under ether narcosis. Six animals, respectively, form a test group and are subcutaneously injected over a period of respectively 3 days with a selected amount of a solution of the test compound dissolved in a mixture of 29% benzyl benzoate and 71% castor oil. On the fourth day, the animals are sacrificed and the weight of the thymus thereof is determined. The control animals are treated in the same manner, but receive a benzyl benzoate-castor oil mixture in the absence of any test compound. From the thus-obtained thymus weights, the thymolytic effect, expressed in percentages, is calculated in the usual manner.

The comparison compound employed again is 6α-fluoro-11β, 21-dihydroxy - 16α - methyl-1,4-pregnadiene-3,20-dione, which effects an approximately 35% thymolysis at a dose of 1.0 mg./kg. of body weight.

When conducting these experiments again with 0.3 mg., 1.0 mg., 3.0 mg., or 10 mg. per kg. of body weight of the following compounds:

methyl ester, butyl ester, and cyclohexyl ester of 6α-fluoro-11β-hydroxy-3,20-dioxo-16α-methyl - 1,4 - pregnadiene-21-oic acid;

methyl ester of 6α-fluoro-2-chloro-11β-hydroxy-3,20-dioxo-16α-methyl-1,4-pregnadiene-21-oic acid;
methyl ester and ethyl ester of 6α,9α-difluoro-11β-hydroxy-3,20-dioxo-16α-methyl - 1,4 - pregnadiene-21-oic acid;
methyl ester and isobutyl ester of 6α-fluoro-9α-chloro-11β-hydroxy - 3,20 - dioxo - 16α - methyl-1,4-pregnadiene-21-oic acid, a 0% thymolytic effect is obtained in all cases.

The fact that the compounds of the general Formula I do not possess any systemic side effects can also be proven with the aid of the eosinophile test, the glycogen test and the sodium-potassium retention test.

Thus, the compounds of this invention which possess topically excellent anti-inflammatory effectiveness but which are systemically inactive. Therefore, these compounds are effective for the treatment of skin inflammations, but, for unknown reasons, they are entirely ineffective once they have entered the bloodstream.

The corticoids employed heretofore for treatment of skin inflammations always exhibit a systemic effect in addition to a topical effect. These corticoids, even when administered topically, can, due to adsorption through the inflamed skin or as a consequence of injuries to the skin, enter into the bloodstream where they affect the body functions in a great variety of ways as hormone-active substances.

This disadvantage is nonexistent in the compounds of the present invention which, although topically effective, are ineffective systemically. Therefore, they are substantially more suitable for the local treatment of inflammations than the known corticoids. Consequently, these substances can be utilized topically without any misgivings even in case of such persons, e.g., infants, pregnant women and diabetics, where the topical treatment with conventional corticoids should be avoided in view of the systemic side effect.

The novel compounds, in combination with the excipients customary in galenic pharmacy, are suitable for the local treatment of contact dermatitis, eczemas of a great variety of types, neurodermatitis, erythrodermia, burns, pruritus vulvae et ani, rosacea, erythrematodes cutaneus, psoriasis, lichen ruber planus et verrucosus and similar skin disorders.

The preparation of the specialty drugs is conducted in the usual manner by bringing the effective agents, with the use of suitable additives, into the desired form of application, such as, for example, solutions, lotions, ointments, creams, aerosols and plasters. In the thus-formulated drugs, the concentration of effective agent is dependent on the form of administration. A concentration of the selected effective agent of 0.001% to 1% is preferably employed, e.g., in case of lotions and ointments.

The topically effective, but systemically ineffective compounds of this invention, in addition to being used as drugs, can also be utilized for the preparation of cosmetic substances in combination with the customary vehicles and scenting compounds. The $\Delta^4$-steroids, 9α-deshalo-steroids, and 2-deschloro-steroids of the general Formula I are also useful as intermediates.

By conventional methods, for example, by treating the $\Delta^4$-steroids with 2,3-dichloro - 5,6 - dicyanobenzoquinone, selenium dioxide, or by the fermentation of these compounds with $\Delta^1$-dehydrogenating microorganisms, such as, for example, *Bacillus lentus* or *Arthrobacter simplex*, the $\Delta^4$-steroids can be dehydrogenated to the corresponding $\Delta^{1,4}$-steroids, the 2-deschloro-compounds can be converted into the corresponding 2-chloro-compounds, for example, according to the processes described in Belgian Pat. No. 749,422; and the 9α-halo-steroids can be produced from the corresponding 9α-hydrogen steroids in a conventional manner, for example, according to the processes described in Belgian Pat. No. 749,422.

The starting compounds for the process of this invention, which are novel, can readily be produced in a simple manner, e.g., as shown schematically below:

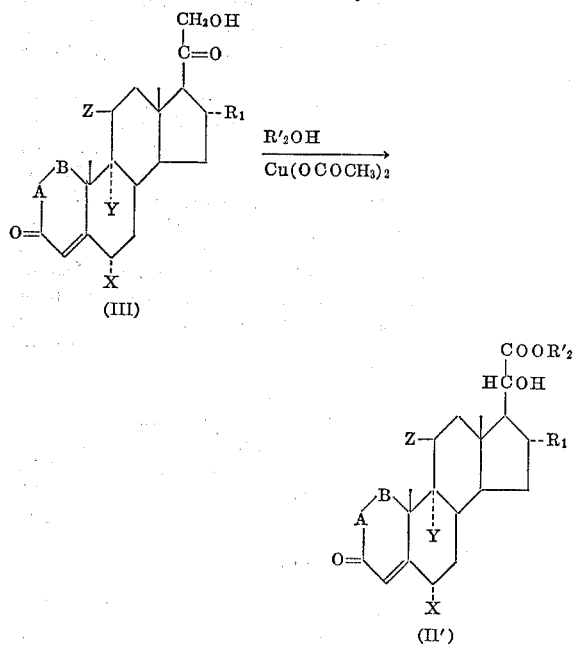

wherein —A—B—, X, Y, Z, and $R_1$ have the same meanings as indicated in Formula II, and $R'_2$ is alkyl.

This reaction can be conducted as follows: Compound III is dissolved in the alcohol $R'_2OH$. The solution is mixed with copper (II) acetate and agitated for several days at room temperature. Then, the mixture is mixed with aqueous ammonia; extracted, for example with methylene chloride; the organic phase is washed with water; dried; and concentrated under vacuum. A crude product is obtained, consisting of a mixture of the $20\alpha_F$- and $20\beta_F$-hydroxy steroids. This mixture can be employed without further purification as a starting product for the process of this invention.

The starting compounds of method (a) of Formula II also possess valuable pharmacological activity, more particularly they possess an antiinflammatory effectiveness upon local and upon systemic application. But the starting compounds of method (a) of Formula II have the disadvantage that they cause thymolytic, glucogenic and mineral corticoid side effects.

The esters of general Formula II' can be saponified, with methanolic sodium hydroxide solution, to the corresponding carboxylic acids.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

(a) A solution of 11.3 g. of 6α-fluoro-11β,21-dihydroxy-16α-methyl-1,4-pregnadiene-3,20-dione in 500 ml. of absolute methanol is mixed with 3.0 g. of copper (II) acetate in 500 ml. of absolute methanol. The solution is agitated at room temperature for 170 hours, then clarified by filtration, and concentrated under vacuum. The residue is mixed with 10% ammonium hydroxide solution and extracted with methylene chloride. The organic phase is washed several times with water, dried over sodium sulfate, and concentrated under vacuum. The residue is chromatographed on 1.3 kg. of silica gel. After recrystallization from acetone-hexane, with 6–7% acetone-methylene chloride, 1.40 g. of the methyl ester of 6α-fluoro-11β,20$\alpha_F$-dihydroxy-3-oxo-16α-methyl-1,4-pregnadiene-21-oic acid is obtained, m.p. 191–192° C. $[\alpha]_D^{25}=0°$ (chloroform). UV: $\epsilon_{243}=15,700$ (methanol).

With 8–10% acetone-methylene chloride, after recrystallizing twice from acetone-hexane, 2.9 g. of the methyl ester of 6α-fluoro-11β,20$\beta_F$-dihydroxy-3-oxo-16α-methyl-1,4-pregnadiene-21-oic acid is obtained, m.p. 128–130° C. $[\alpha]_D^{25}=+22°$ (chloroform). UV: $\epsilon_{242}=15,200$ (methanol).

(b) 2.1 g. of a mixture of the methyl ester of 6α-fluoro-11β,20$\alpha_F$-dihydroxy-3-oxo-16α-methyl-1,4-pregnadiene-21-oic acid and the methyl ester of 6α-fluoro-11β,20$\beta_F$-dihydroxy-3-oxo-16α-methyl-1,4-pregnadiene-21-oic acid is dissolved in 20 ml. of methylene chloride. The solution is mixed with 20 g. of active manganese(IV) oxide ("precipitation active for synthesis purposes" by Merck, A.G.) and refluxed for 6 hours. Then, the reaction mixture is filtered off from the manganese(IV) oxide. The filtrate is evaporated and the residue is recrystallized from acetone-hexane, thus obtaining 450 mg. of the methyl ester of 6α-fluoro-11β-hydroxy-3,20-dioxo-16α-methyl-1,4-pregnadiene-21-oic acid, m.p. 182–184° C. $[\alpha]_D^{25}+144°$ (chloroform). UV: $\epsilon_{242}$ 17,000 (methanol).

(c) A solution of 250 mg. of the methyl ester of 6α-fluoro-11β,20$\alpha_F$-dihydroxy-3-oxo-16α-methyl-1,4-pregnadiene-21-oic acid in 3 ml. of methylene chloride is mixed with 2.5 g. of active manganese(IV) oxide and stirred for 45 minutes at room temperature. The manganese(IV) oxide is removed by filtration, the filtrate is evaporated to dryness, and the residue is recrystallized from acetone-hexane, thus producing 145 mg. of the methyl ester of 6α-fluoro-11β-hydroxy-3,20-dioxo-16α-methyl-1,4-pregnadiene-21-oic acid, m.p. 183° C. $[\alpha]_D^{25}+147°$ (chloroform). UV:$\epsilon_{241}$ 16,900 (methanol).

(d) 4.3 g. of the methyl ester of 6α-fluoro-11β,20$\beta_F$-dihydroxy-3-oxo-16α-methyl-1,4-pregnadiene-21-oic acid is dissolved, with the addition of 50 g. of active manganese(IV) oxide, in 50 ml. of isopropanol. The reaction mixture is agitated at room temperature for 25 hours and filtered off from the manganese(IV) oxide. After evaporation of the solvent, the residue is recrystallized twice from hexane-acetone. Yield: 1.3 g. of the methyl ester of 6α-fluoro-11β,-hydroxy-3,20-dioxo-16α-methyl-1,4-pregnadiene-21-oic acid, m.p. 189–191° C. $[\alpha]_D^{25}+145°$ (chloroform). UV: $\epsilon_{241}$ 17,000 (methanol).

EXAMPLE 2

A solution of 5.0 g. of 6α-fluoro-11β,21-dihydroxy-16α-methyl-1,4-pregnadiene-3,20-dione in 250 ml. of absolute methanol is mixed with 5.0 g. of copper(II) acetate in 750 ml. of absolute methanol, and the mixture is agitated at room temperature for 60 hours. The solvent is evaporated, the residue is mixed with 200 ml. of methylene chloride and 250 g. of active manganese(IV) oxide, and the mixture is shaken at room temperature for 24 hours. After filtration, the reaction mixture is concentrated, and the residue is chromatographed on 250 g. of silica gel. With 6–8% acetone-methylene chloride, one obtains, after recrystallization from acetone-hexane, 1.47 g. of the methyl ester of 6α-fluoro-11β-hydroxy-3,20-dioxo-16α-methyl-1,4-pregnadiene-21-oic acid, m.p. 190–191° C. $[\alpha]_D^{25}+145°$ (chloroform). UV: $\epsilon_{242}$ 16,600 (methanol).

EXAMPLE 3

A solution of 950 mg. of the methyl ester of 6α-fluoro-11β-hydroxy-3,20-dioxo-16α-methyl-1,4-pregnadiene-21-oic acid in 10 ml. of methanol is mixed with 2 ml. of 2N NaOH and allowed to stand under argon for one hour at room temperature. The solution is diluted with 100 ml. of water and extracted with methylene chloride. The aqueous phase is brought to a pH of 3–4 with 1N HCl, and again extracted with methylene chloride. The extract is dried with sodium sulfate and concentrated under vacuum at 20° C. The crude product is taken up in a small amount of ethyl acetate and made to crystallize at −30° C. Yield: 238 mg. of 6α-fluoro-11β-hydroxy-3,20- dioxo-16α-methyl-1,4-pregnadiene-21-oic acid, m.p. 228–230° C. (under decomposition). $[\alpha]_D^{25}+195°$ (pyridine). UV: $\epsilon_{242}$ 16,400 (methanol).

EXAMPLE 4

(a) 6.0 g. of 6α-fluoro-11β,21-dihydroxy-16α-methyl-1,4-pregnadiene-3,20-dione is allowed to stand in 180 ml. of n-butanol for 8 days with 1.6 g. of copper(II) acetate. The reaction mixture is worked up analogously to Example 1(a). The crude product is chromatographed on 350 g. of silica gel. With 9–11% acetone-methylene chloride, after recrystallization from acetone-hexane, 960 mg. of the butyl ester of 6α-fluoro-11β,20α$_F$-dihydroxy-3-oxo-16α-methyl-1,4-pregnadiene-21-oic acid is obtained, m.p. 144–145° C. $[\alpha]_D^{25}+3.4°$ (chloroform). UV: $\epsilon_{241}$ 15,700 (methanol).

With 11–13% acetone-methylene chloride, 1.9 g. of a mixture is eluted of the butyl ester of 6α-fluoro-11β,20α$_F$-dihydroxy - 3 - oxo - 16α-methyl-1,4-pregnadiene-21-oic acid and the butyl ester of 6α-fluoro-11β-20β$_F$-dihydroxy-3-oxo-16α-methyl-1,4-pregnadiene-21-oic acid.

With 13–15% acetone-methylene chloride, after recrystallization from acetone-hexane, 1.71 g. of the butyl ester of 6α - fluoro-11β,20β$_F$-dihydroxy-3-oxo-16α-methyl-1,4-pregnadiene-21-oic acid is produced, m.p. 176–177° C. $[\alpha]_D^{25}+12°$ (chloroform). UV: $\epsilon_{242}$ 15,800.

(b) 3.0 g. of a mixture of the butyl ester of 6α-fluoro-11β,20α$_F$-dihydroxy-3-oxo-16α-methyl - 1,4 - pregnadiene-21-oic acid and the butyl ester of 6α-fluoro-11β,20β$_F$-dihydroxy-3-oxo-16α-methyl-1,4-pregnadiene-21-oic acid is reacted with manganese(IV) oxide under the conditions set forth in Example 1(b). The crude product is chromatographed on 125 g. of silica gel. With 8–10% acetone-hexane, after recrystallization from acetone-hexane, 1.02 g. of the butyl ester of 6α-fluoro-11β-hydroxy-3,20-dioxo-16α-methyl-1,4-pregnadiene-21-oic acid is obtained, m.p. 187–188° C. $[\alpha]_D^{25}+141°$ (chloroform). UV: $\epsilon_{242}$ 17,100 (methanol).

EXAMPLE 5

(a) A mixture of 8.2 g. of 6α-fluoro-9α-chloro-11β,21-dihydroxy-16α-methyl-1,4-pregnadiene - 3,20 - dione, 200 ml. of isobutanol, and 4.1 g. of copper(II) acetate is heated on a steam bath for 53 hours and worked up as described in Example 1(a). The crude product is chromatographed on 400 g. of silica gel. With 6–7% acetone-methylene chloride, after recrystallization from acetone-hexane, 1.00 g. of the isobutyl ester of 6α-fluoro-9α-chloro-11β,20α$_F$-dihydroxy-3-oxo-16α-methyl - 1,4 - pregnadiene-21-oic acid is produced, m.p. 189° C. $[\alpha]_D^{25}+48°$ (dioxane). UV: $\epsilon_{238}$ 15,000 (methanol).

With 8–10% methylene chloride-acetone, after recrystallization from acetone-hexane, 2.1 g. of the isobutyl ester of 6α - fluoro-9α-chloro-11β,20β$_F$-dihydroxy-3-oxo-16α-methyl-1,4-pregnadiene-21-oic acid is obtained, m.p. 215–216° C. $[\alpha]_D^{25}+39°$ (dioxane). UV: $\epsilon_{238}$ 14,800 (methanol).

(b) 4.25 g. of a mixture of the isobutyl ester of 6α-fluoro - 9α - chloro-11β,20α$_F$-dihydroxy-3-oxo-16α-methyl-1,4-pregnadiene-21-oic acid and the isobutyl ester of 6α - fluoro - 9α - chloro-11β,20β$_F$-dihydroxy-3-oxo-16α-methyl-1,4-pregnadiene-21-oic acid is dissolved in 40 ml. of methylene chloride and mixed with 100 g. of active manganese(IV) oxide. After 6 hours of agitation, the reaction mixture is filtered off from the manganese(IV) oxide. After evaporation of the solvent and recrystallizing twice from acetone-hexane, 2.14 g. of the isobutyl ester of 6α-fluoro-9α-chloro-11β-hydroxy-3,20-dioxo-16α-methyl-1,4-pregnadiene-21-oic acid is obtained, m.p. 206–208° C. $[\alpha]_D^{25}+149°$ (dioxane). UV: $\epsilon_{237}$ 16,800 (methanol).

EXAMPLE 6

(a) 16.0 g. of 6α,9α-difluoro-11β,21-dihydroxy-16α-methyl-1,4-pregnadiene-3,20-dione, 8 g. of copper(II) acetate, and 1000 ml. of methanol are reacted as set forth in Example 5(a), worked up, and chromatographed. With 6–8% acetone-methylene chloride, after a one-time recrystallization from hexane-acetone, 1.1 g. of the methyl ester of 6α,9α - difluoro-11β,20α$_F$-dihydroxy-3-oxo-16α-methyl-1,4-pregnadiene-21-oic acid is produced, m.p. m.p. 174° C. $[\alpha]_D^{25}+21°$ (dioxane). UV: $\epsilon_{238}$ 16,400 (methanol).

With 9–11% acetone-methylene chloride, after recrystallization from acetone-hexane, 5.3 g. of the methyl ester of 6α,9α - difluoro-11β,20β$_F$-dihydroxy-3-oxo-16α-methyl-1,4-pregnadiene-21-oic acid is obtained, m.p. 236° C. $[\alpha]_D^{25}+17°$ (dioxane). UV: $\epsilon_{236}$ 16,900 (methanol).

(b) 12.1 g. of a mixture of the methyl ester of 6α,9α-difluoro - 11β,20α$_F$ - dihydroxy - 3 - oxo-16α-methyl-1,4-pregnadiene-21-oic acid and the methyl ester of 6α,9α-difluoro - 11β,20β$_F$ - dihydroxy - 3 - oxo-16α-methyl-1,4-pregnadiene-21-oic acid is mixed with 200 ml. of acetone, 200 ml. of methylene chloride, and 350 g. of active manganese(IV) oxide. After three hours of agitation, the mixture is filtered off from the manganese(IV) oxide, the solvent is evaporated, and the crude product is recrystallized twice from acetone-hexane, thus obtaining 5.1 g. of the methyl ester of 6α,9α-difluoro-11β-hydroxy-3,20-dioxo-16α-methyl-1,4-pregnadiene-21-oic acid, m.p. 207–208° C. $[\alpha]_D^{25}+128°$ (dioxane). UV: $\epsilon_{236}$ 17,100 (methanol).

EXAMPLE 7

(a) 16.0 g. of 6α-fluoro-2-chloro-11β,21-dihydroxy-16α-methyl-1,4-pregnadiene-3,20-dione is refluxed with 8.0 g. of copper(II) acetate in 800 ml. of methanol for 50 hours. The reaction mixture is worked up as described in Example 1(a). The crude product is chromatographed on 1.2 kg. of silica gel. With 8–9% acetone-methylene chloride, after recrystallization from acetone-hexane, 550 mg. of the methyl ester of 6α-fluoro-2-chloro-11β,20α$_F$-dihydroxy-3-oxo-16α-methyl-1,4-pregnadiene-21-oic acid is obtained, m.p. 230–232° C. $[\alpha]_D^{25}-1.4°$ (chloroform). UV: $\epsilon_{250}$ 14,800 (methanol).

With 10–13% acetone-methylene chloride, 10.5 g. is eluted of a mixture of the methyl ester of 6α-fluoro-2-chloro-11β,20α$_F$-dihydroxy-3-oxo-16α-methyl - 1,4 - pregnadiene-21-oic acid and the methyl ester of 6α-fluoro-2-chloro - 11β,20β$_F$ - dihydroxy-3-oxo-1,4-pregnadiene-21-oic acid as a viscous, colorless oil.

With 13–14% acetone-methylene chloride, after recrystallization from acetone-hexane, 1.12 g. of the methyl ester of 6α - fluoro-2-chloro-11β,20β$_F$-dihydroxy-3-oxo-1,4-pregnadiene-21-oic acid is produced, m.p. 211–212° C. $[\alpha]_D^{25}-13°$ (chloroform). UV: $\epsilon_{250}$ 14,800 (methanol).

(b) 10.5 g. of a mixture of the methyl ester of 6α-fluoro - 2 - chloro-11β,20α$_F$-dihydroxy-3-oxo-16α-methyl-1,4-pregnadiene-21-oic acid and the methyl ester of 6α-fluoro - 2 - chloro-11β,20β$_F$-dihydroxy-3-oxo-16α-methyl-1,4-pregnadiene-21-oic acid is dissolved in 60 ml. of methylene chloride and oxidized at room temperature with 150 g. of active manganese(IV) oxide. After filtering off the manganese(IV) oxide and evaporation of the solvent, the crude product is recrystallized twice from acetone-hexane, thus obtaining 1.08 g. of the methyl ester of 6α-fluoro - 2 - chloro-11β-hydroxy-3,20-dioxo-16α-methyl-1,4-pregnadiene-21-oic acid, m.p. 208° C. $[\alpha]_D^{25}+108°$ (dioxane). UV: $\epsilon_{250}$ 15,300 (methanol).

EXAMPLE 8

(a) 5.0 g. of 6α-fluoro-11β,21-dihydroxy-16α-methyl-1,4-pregnadiene-3,20-dione is mixed with 250 ml. of isopropanol and 2.5 g. of copper(II) acetate. The mixture is refluxed for 6 hours and worked up as set forth in Example 1(a). The crude product is chromatographed on 250 g. of silica gel. With 7–9% acetone-methylene chloride, after recrystallization from acetone-hexane, 309 mg. of the isopropyl ester of 6α-fluoro-11β,20α$_F$-dihydroxy-3-oxo-16α-methyl-1,4-pregnadiene-21-oic acid is obtained; m.p. 183–184° C. $[\alpha]_D^{25}+8.5°$ (chloroform). UV: $\epsilon_{242}$ 15,400 (methanol).

With 10–12% acetone-methylene chloride, after recrystallization from hexane-acetone, 459 mg. of the isopropyl ester of 6α-fluoro-11β,20β$_F$-dihydroxy-3-oxo-16α-methyl-1,4-pregnadiene-21-oic acid is obtained, m.p. 182–183° C. $[\alpha]_D^{25}$ +19° (chloroform). UV: $\epsilon_{243}$ 15,500 (methanol).

(b) A mixture of the isopropyl ester of 6α-fluoro-11β,20α$_F$-dihydroxy-3-oxo-16α-methyl - 1,4 - pregnadiene-21-oic acid and the isopropyl ester of 6α-fluoro-11β,20β$_F$-dihydroxy-3-oxo-16α-methyl - 1,4 - pregnadiene-21-oic acid is oxidized under the conditions disclosed in Example 1(b). After recrystallization from hexane-acetone, 1.78 g. of the isopropyl ester of 6α-fluoro-11β-hydroxy-3,20-dioxo-16α-methyl - 1,4 - pregnadiene-21-oic acid is produced, m.p. 219–220° C. $[\alpha]_D^{25}$ +140° (chloroform).

EXAMPLE 9

(a) Under the reaction conditions described in Example 1(a), but using isoamyl alcohol as the solvent, a mixture of the isoamyl ester of 6α-fluoro-11β,20α$_F$-dihydroxy-3-oxo-16α-methyl-1,4-pregnadiene-21-oic acid and the isoamyl ester of 6α-fluoro-11β,20β$_F$-dihydroxy-3-oxo-16α-methyl-1,4-pregnadiene-21-oic acid is produced from 6α-fluoro - 11β,21 - dihydroxy - 16α - methyl-1,4-pregnadiene-3,20-dione.

(b) 9.9 g. of the thus-obtained mixture is converted, under the conditions described in Example 1(b), into 4.0 g. of the isoamyl ester of 6α-fluoro-11β-hydroxy-3,20-dioxo-16α-methyl-1,4-pregnadiene-21-oic acid, m.p. 189–190° C. $[\alpha]_D^{25}$ +134° (chloroform).

EXAMPLE 10

(a) Under the reaction conditions described in Example 1(a), but using tert.-butanol as the solvent, 9.8 g. of a mixture of the tert.-butyl ester of 6α-fluoro-11β,20α$_F$-dihydroxy-3-oxo-16α-methyl - 1,4 - pregnadiene-21-oic acid and the tert.-butyl ester of 6α-fluoro-11β,20β$_F$-dihydroxy-3-oxo-16α-methyl - 1,4 - pregnadiene-21-oic acid is obtained from 20 g. of 6α-fluoro-11β,21-dihydroxy-16α-methyl-1,4-pregnadiene-3,20-dione.

(b) The thus-obtained mixture is converted, as set forth in Example 1(b), into the tert.-butyl ester of 6α-fluoro-11β-hydroxy-3,20-dioxo - 16α - methyl-1,4-pregnadiene-21-oic acid. Yield: 3.16 g. (from hexane-acetone). Melting point: 175–176° C. $[\alpha]_D^{25}$ +127° (chloroform).

EXAMPLE 11

(a) Under the reaction conditions described in Example 1(a), but utilizing ethanol as the solvent, 6.1 g. of a mixture of the ethyl ester of 6α,9α-difluoro-11β,20α$_F$-dihydroxy-3-oxo-16α-methyl - 1,4 - pregnadiene-21-oic acid and the ethyl ester of 6α,9α-difluoro-11β,20β$_F$-dihydroxy-3-oxo-16α-methyl - 1,4 - pregnadiene-21-oic acid is obtained from 8.6 g. of 6α,9α-difluoro-11β,21-dihydroxy-16α-methyl-1,4-pregnadiene-3,20-dione.

(b) 4.3 g. of the thus-obtained mixture is converted, as described in Example 1(b), into the ethyl ester of 6α,9α-difluoro-11β-hydroxy - 3,20 - dioxo-16α-methyl-1,4-pregnadiene-21-oic acid. The crude product is recrystallized twice from hexane-acetone, yielding 1.02 g. of the pure product, m.p. 205–206° C. $[\alpha]_D^{25}$ +126° (dioxane).

EXAMPLE 12

(a) Under the reaction conditions set forth in Example 4(a), a mixture of 6α,9α-difluoro-11β,20α$_F$-dihydroxy-3-oxo-16α-methyl-1,4-pregnadiene-21-oic acid butyl ester and 6α,9α-difluoro - 11β,20β$_F$ - dihydroxy-3-oxo-16α-methyl-1,4-pregnadiene-21-oic acid butyl ester is produced from 6α,9α-difluoro - 11β,21 - dihydroxy-16α-methyl-1,4-pregnadiene-3,20-dione.

(b) The thus-obtained mixture is converted, as described in Example 4(b), into the butyl ester of 6α,9α-difluoro-11β-hydroxy - 3,20 - dioxo-16α-methyl-1,4-pregnadiene-21-oic acid. m.p. 190–192° C. $[\alpha]_D^{25}$ +122° (chloroform).

EXAMPLE 13

(a) Under the reaction conditions described in Example 1(a), 15.4 g. of a mixture of the methyl ester of 6α-fluoro-9α-chloro - 11β,20α$_F$ - dihydroxy-3-oxo-16α-methyl-1,4-pregnadiene-21-oic acid and the methyl ester of 6α-fluoro-9α-chloro-11β,20β$_F$-dihydroxy-3-oxo - 16α - methyl-1,4-pregnadiene-21-oic acid is obtained from 16.0 g. of 6α-fluoro-9α-chloro - 11β,21 - dihydroxy-16α-methyl - 1,4-pregnadiene-3,20-dione.

(b) 12.9 g. of the thus-obtained mixture is converted, as described in Example 1(b), into 5.40 g. of the methyl ester of 6α-fluoro-9α-chloro-11β-hydroxy - 3,20 - dioxo-16α-methyl-1,4-pregnadiene-21-oic acid, m.p. 226–228° C. $[\alpha]_D^{25}$ +154° (dioxane).

EXAMPLE 14

(a) Under the reaction conditions set forth in Example 4(a), a mixture of the butyl ester of 6α-fluoro-9-chloro-11β,20α$_F$-dihydroxy-3-oxo - 16α - methyl-1,4-pregnadiene-21-oic acid and the butyl ester of 6α-fluoro-9-chloro-11β,20β$_F$-dihydroxy-3-oxo-16α-methyl - 1,4 - pregnadiene-21-oic acid is produced from 8.0 g. of 6α-fluoro-9-chloro-11β,21-dihydroxy-16α-methyl-1,4-pregnadiene-3,20-dione.

(b) 5.3 g. of the thus-obtained mixture is converted, as set out in Example 4(b), into 1.11 g. of the butyl ester of 6α-fluoro-9α-chloro - 11β - hydroxy-3,20-dioxo-16α-methyl-1,4-pregnadiene-21-oic acid, m.p. 181–182° C. $[\alpha]_D^{25}$ +148° (chloroform).

EXAMPLE 15

(a) Under the reaction conditions set forth in Example 1(a), but using cyclohexanol as the solvent, a mixture of the cyclohexyl ester of 11β,20α$_F$-dihydroxy-3-oxo-6α,16α-dimethyl-1,4-pregnadiene-21-oic acid and the cyclohexyl ester of 11β,20β$_F$-dihydroxy-3-oxo-6α,16α-dimethyl-1,4-pregnadiene-21-oic acid is obtained from 11β,21-dihydroxy-6α,16α-dimethyl-1,4-pregnadiene-3,20-dione.

(b) The thus-produced mixture is converted, as described in Example 1(b), into the cyclohexyl ester of 11β-hydroxy - 3,20 - dioxo - 6α,16α-dimethyl-1,4-pregnadiene-21-oic acid, m.p. 258–260° C. $[\alpha]_D^{25}$ +130° (dioxane).

EXAMPLE 16

(a) Under the reaction conditions set forth in Example 1(a), 12.3 g. of the methyl ester of 6α-fluoro-9α,11β-dichloro - 20β$_F$ - hydroxy - 3 - oxo-16α-methyl-1,4-pregnadiene-21-oic acid, m.p. 217–219° C., is obtained after recrystallization from acetone-hexane, from 19.8 g. of 6α-fluoro - 9α,11β - dichloro - 21 - hydroxy - 16α-methyl-1,4-pregnadiene-3,20-dione.

(b) The thus-produced compound is converted, as disclosed in Example 1(b), into 6.4 g. of the methyl ester of 6α - fluoro - 9α,11β - dichloro - 3,20-dioxo-16α-methyl-1,4 -pregnadiene - 21-oic acid, m.p. 218–220° C. $[\alpha]_D^{25}$ +165° (dioxane).

EXAMPLE 17

(a) Under the reaction conditions described in Example 1(a), 12.1 g. of the methyl ester of 6α,11β-difluoro-9α - chloro - 20β$_F$ - hydroxy-3-oxo-16α-methyl-1,4-pregnadiene-21-oic acid, m.p. 246–247° C., is obtained from 18.1 g. of 6α,11β-difluoro-9α-chlor-21-hydroxy-16α-methyl-1,4-pregnadiene-3,20-dione after recrystallization from hexane-acetone.

(b) The thus-obtained product is converted, as set forth in Example 1(b), into 4.5 g. of the methyl ester of 6α,11β-difluoro - 9α - chloro - 3,20 - dioxo-16α-methyl-1,4-pregnadiene-21-oic acid, m.p. 238–239° C. $[\alpha]_D^{25}$ +136° (chloroform).

EXAMPLE 18

Ointment Composition 0.01% Methyl ester of 6α-fluoro-11β-hydroxy-3,20-dioxo-16α-methyl-1,4-pregnadiene-21-oic acid
2.50% "Allercur" hexachlorophenate, micronized, particle size about 8μ ("Allercur"=registered trademark for 1-(p - chlorobenzyl) - 2 - pyrrolidylmethylenebenzimidazole)
6.00% "Hostaphat KW 340" (tertiary ester of o-phosphoric acid and wax alcohol tetraglycol ether)
0.10% Sorbic acid
10.00% Neutral oil ("Migloyol 812")
3.50% Stearyl alcohol
1.50% Lanolin, anhydrous DAB (German Pharmacopeia) 6
76.39% Desalted water

EXAMPLE 19

Ointment Composition 0.01 g. Butyl ester of 6α-fluoro-11β-hydroxy-3,20-dioxo-16α-methyl-1,4-pregnadiene-21-oic acid
5.00 g. White wax DAB 6
5.00 g. Lanoline, anhydrous DAB 6
20.00 g. Vaseline, white DAB 6
25.00 g. Amphocerin K "Dehydag"
14.97 g. Paraffin oil, liquid DAB 6
30.00 g. Water, desalted
0.02 g. Crematest perfume oil No. 6580 "Dragee"

EXAMPLE 20

Composition for Eye Drops (Oily)

100 mg. of the isobutyl ester of 6α-fluoro-9α-chloro-11β-hydroxy - 3,20 - dioxo - 16α - methyl-1,4-pregnadiene-21-oic acid is dissolved in
100 ml. of castor oil.

After the addition of 200 mg. of chloramphenicol (or another bacteriostatic agent), the solution is filtered under sterile conditions and aseptically bottled.

EXAMPLE 21

Composition for Eardrops 100 mg. of the methyl ester of 6α-fluoro-11β-hydroxy-3,20-dioxo-16α-methyl-1,4-pregnadiene-21-oic acid is dissolved in 1,2-propylene glycol/ethyl alcohol (9:1). The solution is prepared in a quantity of 100 ml., and 200 mg. of chloramphenicol is added thereto.

EXAMPLE 22

50 mg. of 6α-fluoro-11β-hydroxy-3,20-dioxo-16α-methyl-1,4-pregnadiene-21-oic acid is dissolved in 3 ml. of methylene chloride and mixed with 3 ml. of ethereal diazomethane solution. After 10 minutes, acetic acid is added dropwise, until the yellow coloring has disappeared; then, the solvent is evaporated under vacuum. The residue is recrystallized from acetone-hexane. Yield: 38 mg. of the methyl ester of 6α-fluoro-11β-hydroxy-3,20-dioxo-16α-methyl-1,4-pregnadiene-21-oic acid, m.p. 189–190° C.

EXAMPLE 23

500 mg. of 6α-fluoro-11β-hydroxy-3,20-dioxo-16α-methyl-1,4-pregnadiene-21-oic acid is dissolved in 100 ml. of absolute ether, and mixed with 7 ml. of butanol and 1.5 ml. of dicyclohexyl carbodiimide. After 18 hours of agitation at room temperature, the reaction mixture is vacuum-filtered from the thus-precipitated dicyclohexyl urea. The filtrate is concentrated, and the crude product is chromatographed on silica gel. With 9–11% acetone-hexane, after recrystallization from acetone-hexane, 256 mg. of the butyl ester of 6α-fluoro-11β-hydroxy-3,20-dioxo-16α-methyl-1,4-pregnadiene-21-oic acid is obtained, m.p. 185–187° C.

EXAMPLE 24

5.0 g. of the butyl ester of 6α-fluoro-11β-hydroxy-3,20-dioxo-16α-methyl-1,4-pregnadiene-21-oic acid is dissolved in 300 ml. of absolute ethanol and mixed with 250 mg. of potassium tert.-butylate. The mixture is refluxed under an argon atmosphere for one hour. The reaction product is precipitated with 1% acetic acid, and the precipitate is vacuum-filtered. The crystalline crude product is taken up in 100 ml. of methylene chloride, washed with saturated sodium bicarbonate solution and water, and the solution is dried with sodium sulate and freed of the solvent under vacuum. By recrystallization of the crude product from acetone-hexane, 2.20 g. of the ethyl ester of 6α-fluoro - 11β - hydroxy - 3,20 - dioxo-16α-methyl-1,4-pregnadiene-21-oic acid is obtained, m.p. 183° C. $[\alpha]_D^{25}$ +143° (chloroform).

EXAMPLE 25

5.0 g. of the butyl ester of 6α-fluoro-11β-hydroxy-3,20-dioxo-16α-methyl-1,4-pregnadiene-21-oic acid is dissolved in 180 ml. of anhydrous isopropyl alcohol, and 150 mg. of potassium tert.-butylate is added thereto. The solution is heated to the boiling point for 19 hours under an argon atmosphere. The reaction product is precipitated with 3 l. of ice water containing 2 ml. of glacial acetic acid. The precipitate is filtered off, taken up in 100 ml. of methylene chloride, and the organic phase is washed with saturated sodium bicarbonate solution and with water. The solution is dried with sodium sulfate, and, after evaporation of the solvent, the crude product is chromatographed on 500 g. of silica gel with acetone-hexane; after recrystallization from hexane-acetone, 1.72 g. of the isopropyl ester of 6α-fluoro-11β-hydroxy-3,20-dioxo-16α-methyl-1,4-pregnadiene-21-oic acid is obtained, m.p. 223° C. $[\alpha]_D^{25}$ +140° (chloroform).

EXAMPLE 26

1.0 g. of the methyl ester of 6α,11β-difluoro-9-chloro-3,20-dioxo-16α-methyl-1,4-pregnadiene-21-oic acid is dissolved in 50 ml. of n-butanol and mixed, under an argon atmosphere, with 60 mg. of potassium tert.-butylate. The reaction mixture is agitated for 1 hour at 30° C., then diluted with 100 ml. of methylene chloride, and washed with 50 ml. of 1% acetic acid. The organic phase is washed with water and dried with sodium sulfate. The crude product is chromatographed on 300 g. of silica gel with hexane-acetone; after recrystallization from acetone-hexane, 615 mg. of the butyl ester of 6α,11β-difluoro-9-chloro-3,20-dioxo-16α-methyl-1,4-pregnadiene-21-oic acid is obtained, m.p. 152° C. $[\alpha]_D^{25}$+135° (chloroform).

EXAMPLE 27

5.0 g. of the butyl ester of 6α-fluoro-11β-hydroxy-3,20-dioxo-16α-methyl-1,4-pregnadiene-21-oic acid is reacted, as described in Example 24, with n-propanol and worked up. After recrystallization from acetone-hexane, 2.07 g. of the propyl ester of 6α-fluoro-11β-hydroxy-3,20-dioxo-16α-methyl-1,4-pregnadiene-21-oic acid is produced, m.p. 180° C. $[\alpha]_D^{25}$ +140° (chloroform).

EXAMPLE 28

400 mg. of potassium tert.-butylate is added to a solution of 4.6 g. of the butyl ester of 6α-fluoro-11β-hydroxy-3,20-dioxo-16α-methyl-1,4-pregnadiene-21-oic acid in 300 ml. of sec.-butanol. The reaction mixture is heated under an argon atmosphere for 18 hours to 80° C., then diluted with 300 ml. of methylene chloride, and the solution is washed successively with 1% acetic acid and with water. After drying with sodium sulfate and evaporation of the solvent, the crude product is recrystallized twice from acetone-hexane, thus obtaining 1.35 g. of the sec.-butyl ester of 6α - fluoro - 11β-hydroxy-3,20-dioxo-16α-methyl-1,4-pregnadiene-21-oic acid, m.p. 211° C. $[\alpha]_D^{25}$ +138° (chloroform).

EXAMPLE 29

5.0 g. of the isobutyl ester of 6α-fluoro-11β-hydroxy-3,20-dioxo-16α-methyl-1,4-pregnadiene-21-oic acid is dissolved in 250 ml. of isopentanol and mixed with 250 mg. of potassium tert.-butylate. The solution is heated for 1 hour to 100° C. under argon, then diluted with an equal volume of methylene chloride, washed with 1% acetic acid and water, and the organic solution is dried with sodium sulfate and the solvents are distilled off under vacuum. The crude product is chromatographed with hexane-acetone on 500 g. of silica gel and recrystallized from acetone-hexane, thus obtaining 1.92 g. of the isopentyl ester of 6α-fluoro-11β-hydroxy-3,20-dioxo-16α-methyl-1,4-pregnadiene-21-oic acid, m.p. 192° C. $[\alpha]_D^{25}$ +135° (chloroform).

EXAMPLE 30

9.9 g. of the methyl ester of 6α-fluoro-11β-hydroxy-3,20-dioxo-16α-methyl-1,4-pregnadiene-21-oic acid is dissolved in 250 ml. of isopentanol and mixed with 200 mg. of aluminum isopropylate. The mixture is heated to 100° C. for 8 hours under an argon atmosphere, diluted with 250 ml. of methylene chloride, and washed with 1% acetic acid and with water. The solution is dried with sodium sulfate and freed of the solvents under vacuum. After recrystallizing the crude product twice from acetone-hexane, 4.0 g. of the isopentyl ester of 6α-fluoro-11β-hydroxy-3,20-dioxo-16α-methyl-1,4-pregnadiene-21-oic acid is obtained, m.p. 191° C. $[\alpha]_D^{25}$ +134° (chloroform).

EXAMPLE 31

100 mg. of potassium tert.-butylate is added to a solution of 1.0 g. of the butyl ester of 6α-fluoro-11β-hydroxy-3,20-dioxo-16α-methyl-1,4-pregnadiene-21-oic acid in 100 ml. of absolute methanol, and the mixture is refluxed under argon for 1 hour. The mixture is precipitated with ten times the amount of ice water, the precipitate is vacuum-filtered, taken up in methylene chloroide, and the solution is washed with 1% acetic acid, saturated sodium bicarbonate solution, and with water. After drying with sodium sulfate, the reaction mixture is freed of the solvent under vacuum, and the crude product is recrystallized from acetone-hexane, thus obtaining 570 mg. of the methyl ester of 6α-fluoro-11β-hydroxy-3,20-dioxo-16α-methyl-1,4-pregnadiene-21-oic acid, m.p. 190° C. $[\alpha]_D^{25}$ +145° (chloroform).

EXAMPLE 32

4.8 g. of the butyl ester of 6α-fluoro-11β-hydroxy-3,20-dioxo-16α-methyl-1,4-pregnadiene-21-oic acid is dissolved in 150 ml. of isobutanol and mixed with 250 mg. of potassium tert.-butylate. The mixture is heated under argon to 90° C. for 18 hours and then worked up, as described in Example 29. The crude product is twice recrystallized from acetone-hexane, thus obtaining 1.60 g. of the isobutyl ester of 6α-fluoro-11β-hydroxy-3,20-dioxo-16α-methyl-1,4-pregnadiene-21-oic acid, m.p. 185–186° C. $[\alpha]_D^{25}$ +130° (chloroform).

EXAMPLE 33

1.8 g. of the methyl ester of 6α-fluoro-9α,11β-dichloro-3,20-dioxo-16α-methyl-1,4-pregnadiene-21-oic acid is dissolved in 110 ml. of n-butanol and mixed with 200 mg. of potassium tert.-butylate. The reaction mixture is heated for 1 hour under argon to 100° C. and worked up, as described in Example 29. The crude product is chromatographed on 250 g. of silica gel with acetone-hexane, thus obtaining 1.54 g. of the butyl ester of 6α-fluoro-9α,11β-dichloro-3,20-dioxo-16α-methyl-1,4-pregnadiene-21-oic acid, melting at 147° C. after recrystallization from acetone-hexane. $[\alpha]_D^{25}$ +165° (chloroform).

EXAMPLE 34

5.0 g. of the methyl ester of 6α-fluoro-11β-hydroxy-3,20-dioxo-16α-methyl-1,4-pregnadiene-21-oic acid is added to a solution of 100 mg. of sodium in 100 ml. of n-decanol. The reaction mixture is heated for 28 hours at 100° C., mixed with 300 ml. of methylene chloride, and washed with 1% acetic acid, saturated sodium bicarbonate solution, and water. After drying with sodium sulfate, the methylene chloride is first distilled off under vacuum, and then the decanol is removed under a high vacuum. The crude product is chromatographed on 500 g. of silica gel with acetone-hexane, thus obtaining 3.9 g. of the decyl ester of 6α-fluoro-11β-hydroxy-3,20-dioxo-16α-methyl-1,4-pregnadiene-21-oic acid, melting at 93.5° C. after recrystallization from acetone-hexane. $[\alpha]_D^{25}$ +117° (chloroform).

EXAMPLE 35

700 mg. of the methyl ester of 6α-fluoro-9α-chloro-11β-hydroxy-3,20-dioxo-16α-methyl-1,4-pregnadiene-21-oic acid is dissolved, under heating, in 60 ml. of n-butanol and, after cooling, mixed with 20 mg. of potassium tert.-butylate. The solution is agitated for 2 hours under argon at room temperature, diluted with methylene chloride, and further worked up as described in Example 29. Upon chromatographing the mixture on 250 g. of silica gel, with acetone-hexane, 610 mg. of the butyl ester of 6α-fluoro-9α-chloro-11β-hydroxy-3,20-dioxo-16α-methyl-1,4-pregnadiene-21-oic acid is obtained. After recrystallization from acetone-hexane, 465 mg. of product is obtained, melting at 180.8° C. under decomposition. $[\alpha]_D^{25}$ +150° (chloroform).

EXAMPLE 36

1.8 g. of the butyl ester of 6α-fluoro-11β-hydroxy-3,20-dioxo-16α-methyl-1,4-pregnadiene-21-oic acid is mixed with 30 ml. of 2-propen-1-ol, 10 mg. of hydroquinone, and 100 mg. of potassium tert.-butylate and heated under argon for 18 hours to 100° C. The reaction mixture is worked up as indicated in Example 31 and chromatographed on 250 g. of silica gel with acetone-hexane, thus producing 1.2 g. of the 2'-propenyl ester of 6α-fluoro-11β-hydroxy-3,20-dioxo-16α-methyl-1,4-pregnadiene-21-oic acid. After recrystallizing once from acetone-hexane, 340 mg. remains, melting at 159° C. $[\alpha]_D^{25}$ +142° (chloroform).

EXAMPLE 37

1.2 g. of the butyl ester of 6α-fluoro-11β-hydroxy-3,20-dioxo-16α-methyl-1,4-pregnadiene-21-oic acid, 50 ml. of ethylene glycol monomethyl ether, and 100 mg. of potassium tert.-butylate are heated for 5 hours to 100° C. The reaction mixture is worked up as set forth in Example 31. Chromatography on 250 g. of silica gel with acetone-hexane yields 730 mg. of the 2'-methoxyethyl ester of 6α-fluoro-11-β-hydroxy-3,20-dioxo-16α-methyl-1,4-pregnadiene-21-oic acid; after recrystallizing once from acetonehexane, 169 mg. of product is obtained, melting at 134° C. $[\alpha]_D^{25}$ +135° (chloroform).

EXAMPLE 38

5.0 g. of the methyl ester of 6α-fluoro-11β-hydroxy-3,20-dioxo-16α-methyl-1,4-pregnadiene-21-oic acid is mixed with 30 ml. of octanol and 250 mg. of potassium tert.-butylate and heated to 100° C. for 48 hours.

The reaction product is worked up as described in Example 29, thus producing 3.9 g. of the octyl ester of 6α-fluoro-11β-hydroxy-3,20-dioxo-16α-methyl-1,4-pregnadiene-21-oic acid as a viscous oil. $[\alpha]_D^{25}$ +124° (chloroform).

EXAMPLE 39

1.0 g. of the butyl ester of 6α-fluoro-11β-hydroxy-3,20-dioxo-16α-methyl-1,4-pregnadiene-21-oic acid is mixed with 20 ml. of 2-propyn-1-ol and 100 mg. of potassium tert.-butylate and agitated for 24 hours at room temperature.

The mixture is worked up as described in Example 25, thus obtaining 280 mg. of the 2'-propynyl ester of 6α- fluoro - 11β-hydroxy-3,20-dioxo - 16α-methyl-1,4-pregnadiene - 21 - oic acid, m.p. 179–182° C. $[\alpha]_D^{25}$ +152° (chloroform).

EXAMPLE 40

4.0 g. of the butyl ester of 6α-fluoro-11β-hydroxy-3,20-dioxo-16α-methyl-1,4 - pregnadiene - 21-oic acid is mixed 70 ml. of benzyl alcohol and 100 mg. potassium tert.-butylate and heated under argon for 28 hours to 100° C.

The reaction mixture is worked up as set out in Example 29, thus obtaining 810 mg. of the benzyl ester of 6α - fluoro - 11β - hydroxy-3,20-dioxo-16α-methyl-1,4-pregnadiene - 21 - oic acid, m.p. 213° C. $[\alpha]_D^{25}$ +127° (chloroform).

EXAMPLE 41

1.0 g. of the butyl ester of 6α-fluoro-11β-hydroxy-3,20-dioxo-16α - methyl - 1,4-pregnadiene - 21 - oic acid is mixed with 15 ml. of (−)(S) - 2 - methyl-1-butanol and 25 mg. of potassium tert.-butylate and heated for 25 hours to 100° C.

The reaction mixture is worked up as described in Example 29, thus obtaining 240 mg. of the 2′(S)-methyl-butyl ester of 6α - fluoro-11β-hydroxy-3,20-dioxo-16α-methyl - 1,4-pregnadiene - 21 - oic acid, m.p. 177° C. $[\alpha]_D^{25}$ +132° (chloroform).

EXAMPLE 42

1.0 g. of the butyl ester of 6α-fluoro-11β-hydroxy-3,20-dioxo-16α-methyl-1,4-pregnadiene - 21 - oic acid is mixed with 25 ml. of anhydrous 1,3-propanediol and 100 mg. of potassium tert.-butylate and heated for 3 hours to 100° C.

The reaction mixture is worked up as described in Example 25, thus producing 510 mg. of the 3′-hydroxypropyl ester of 6α - fluoro-11β-hydroxy - 3,20 - dioxo-16α-methyl - 1,4-pregnadiene-21-oic acid, m.p. 130–131° C. $[\alpha]_D^{25}$ +120° (chloroform).

EXAMPLE 43

1.0 g. of the methyl ester of 6α-fluoro - 2- chloro-11β-hydroxy-3,20 - dioxo - 16α - methyl - 1,4-pregnadiene-21-oic acid is mixed with 10 g. of menthol and 100 mg. of potassium tert-butylate and heated for 18 hours to 120° C.

Thereafter, the reaction mixture is concentrated under vacuum, the residue is taken up in methylene chloride, the methylene chloride phase is washed and concentrated under vacuum. The residue is purified by chromatography over a silica gel column with hexane-acetone, thus producing 730 mg. of the menthyl ester of 6α-fluoro - 2 - chloro - 11β - hydroxy - 3,20 - dioxo-16α-methyl-1,4-pregnadiene-21-oic acid as an amorphous powder. $[\alpha]_D^{25}$ +86° (chloroform).

EXAMPLE 44

1.0 g. of 6α-fluoro - 11β - hydroxy - 3,20-dioxo-16α-methyl-1,4-pregnadiene - 21 - oic acid is dissolved in 200 ml. of absolute ether, and the solution is mixed with 14 ml. of ethanol and 3.0 ml. of dicyclohexyl carbodiimide.

The reaction mixture is agitated for 18 hours at room temperature, filtered, the filtrate is concentrated under vacuum, and the crude product is purified by chromatography over a silica gel column with hexane-acetone, thus obtaining 620 mg. of 6α-fluoro - 11β - hydroxy-3,20-dioxo - 16α - methyl - 1,4 - pregnadiene - 21 - oic acid ethyl ester, m.p. 182–183° C. $[\alpha]_D^{25}$ +143° (chloroform).

EXAMPLE 45

(a) 16.0 g. of 6α - fluoro - 11β,21 - dihydroxy-16α-methyl - 1,4 - pregnadiene - 3,20 - dione is reacted with hexanol under the conditions described in Example 1(a); a mixture of the hexyl ester of 6α-fluoro-11β,20α$_F$-dihydroxy - 3 - oxo - 16α - methyl - 1,4 - pregnadiene-21-oic acid and the hexyl ester of 6α-fluoro-11β,20β$_F$-dihydroxy-3-oxo - 16α - methyl - 1,4 - pregnadiene - 21 - oic acid is produced.

(b) 2.5 g. of the thus-obtained mixture is oxidized and worked up as set forth in Example 1(b), thus producing 1.8 g. of the hexyl ester of 6α-fluoro-11β-hydroxy-3,20-dioxo - 16α - methyl - 1,4 - pregnadiene - 21 - oic acid as an oil. $[\alpha]_D^{25}$ +135° (chloroform).

EXAMPLE 46

(a) 10.5 g. of 6α - fluoro - 11β,21 - dihydroxy-16α-methyl - 1,4 - pregnadiene - 3,20 - dione is reacted with cyclohexanol under the conditions disclosed in Example 1(a), thus obtaining a mixture of the cyclohexyl ester of 6α - fluoro - 11β,21α$_F$ - dihydroxy - 3 - oxo - 16α - methyl-1,4-pregnadiene-21-oic acid and the cyclohexyl ester of 6α-fluoro - 11β,21β$_F$ - dihydroxy-3-oxo-16α-methyl-1,4-pregnadiene-21-oic acid.

(b) 5.1 g. of this mixture is oxidized as described in Example 1(b), thus producing 1.35 g. of the cyclohexyl ester of 6α - fluoro - 11β - hydroxy - 3,20 - dioxo - 16α-methyl - 1,4 - pregnadiene - 21 - oic acid, m.p. 258–260° C. $[\alpha]_D^{25}$ +130° (dioxane).

EXAMPLE 47

(a) 12.0 g. of 6α-fluoro - 11β,21 - dihydroxy - 16α-methyl - 1,4 - pregnadiene - 3,20 - dione is reacted, under the reaction conditions described in Example 1(a), with decanol, thus obtained a mixture of the decyl ester of 6α - fluoro - 11β,20α$_F$ - dihydroxy - 3 - oxo - 16α-methyl - 1,4 - pregnadiene-21-oic acid and the decyl ester of 6α - fluoro - 11β,20β$_F$ - dihydroxy - 3 - oxo-16α-methyl-1,4-pregnadiene-21-oic acid.

(b) 4.8 g. of the thus-obtained mixture is oxidized and worked up under the conditions set forth in Example 1(b), thus obtaining 1.82 g. of the decyl ester of 6α-fluoro - 11β - hydroxy - 3,20 - dioxo - 16α - methyl - 1,4-pregnadiene-21-oic acid, m.p. 89–90° C. $[\alpha]_D^{25}$ +117° (chloroform).

EXAMPLE 48

(a) A solution of 5.0 g. of 6α-fluoro - 11β,21 - dihydroxy - 16α - methyl - 4 - pregnene - 3,20 - dione in 250 ml. of butanol is mixed with 5.0 g. of copper(II) acetate in 750 ml. of butanol, and the mixture is agitated for 60 hours at room temperature. Then, the reaction mixture is concentrated to dryness under vacuum, thus obtaining a mixture of the butyl ester of 6α-fluoro-11β,20α$_F$-dihydroxy - 3 - oxo - 16α - methyl - 4 - pregnene - 21 - oic acid and the butyl ester of 6α-fluoro - 11β,20β$_F$ - dihydroxy-3-oxo-16α-methyl-4-pregnene-21-oic acid.

(b) The thus-produced mixture is mixed, without any further purification, with 200 ml. of methylene chloride and 250 g. of active manganese(IV) oxide, and shaken for 24 hours at room temperature. Then, the manganese(IV) oxide is filtered off, the organic phase is washed with water, dilute hydrochloric acid, and water, dried with magnesium sulfate, and concentrated under vacuum, thus obtaining 2.63 g. of the butyl ester of 6α-fluoro - 11β - hydroxy-3,20 - dioxo - 16α - methyl - 4 - pregnene-21-oic acid as the crude product.

(c) 2.00 g. of the thus-obtained crude product is mixed with 3.00 g. of 2,3-dichloro-5,6-dicyanobenzoquinone and 60 ml. of absolute benzene, and the mixture is refluxed for 24 hours. Then, the reaction mixture is allowed to cool, filtered, and concentrated to dryness under vacuum. The residue is chromatographed over a silica gel column by means of a hexaneacetone gradient, resulting in 584 mg. of the butyl ester of 6α-fluoro - 11β - hydroxy-3,20-dioxo-16α-methyl - 1,4 - pregnadiene - 21 - oic acid, m.p. 145.5° C.

EXAMPLE 49

1.0 g. of the methyl ester of 6α-fluoro - 11β - hydroxy-3,20 - dioxo - 16α - methyl - 1,4 - pregnadiene - 21 - oic acid is dissolved in 10 ml. of tetrahydrofuran and 10 ml. of methylene chloride, mixed with 2 g. of N-chlorosuccinimide and 2 ml. of dioxane saturated with hydrogen chloride, and stored for 20 minutes at room temperature. Then, the reaction mixture is poured into water, the thus-separated product is extracted with chloroform, and the chloroform phase is concentrated to dryness under vacuum.

The residue is dissolved in 10 ml. of pyridine, and the solution is heated for 2 hours to 60° C. and then poured into 1N aqueous hydrochloric acid. The mixture is extracted with methylene chloride, the methylene chloride phase is washed and concentrated under vacuum. The crude product is chromatographed over 100 g. of silica gel by means of a hexane-acetone gradient, thus obtaining, after recrystallization from acetone-hexane, 385 mg. of the methyl ester of 6α - fluoro - 2 - chloro - 11β - hydroxy-3,20 - dioxo - 16α - methyl - 1,4 - pregnadiene - 21 - oic acid, m.p. 208° C.

EXAMPLE 50

(a) 3.0 g. of the butyl ester of 6α-fluoro-11β-hydroxy-3,20 - dioxo - 16α - methyl - 1,4 - pregnadiene - 21 - oic acid is mixed with 5.0 ml. of dimethylformamide, 1 ml. of pyridine, and 1.5 ml. of methanesulfonic acid chloride, and heated for one hour under argon to 80° C. Then, the reaction mixture is poured into acidified ice water, the thus-separated product is filtered off, washed with water, dried under vacuum at 60° C., and in this way, 2.15 g. of the butyl ester of 6α - fluoro - 3,20 - dioxo - 16α-methyl - 1,4,9(11) - pregnatriene - 21 - oic acid is obtained as the crude product.

(b) A mixture of 1.0 g. of the butyl ester of 6α-fluoro - 3,20 - dioxo - 16α - methyl - 1,4,9(11) - pregnatriene - 21 - oic acid, 40 ml. of dioxane, 10 ml. of water, 4.0 g. of N-chlorosuccinimide, and 4 ml. of 70% perchloric acid is agitated for one hour at room temperature.

Then, the reaction mixture is poured into aqueous sodium sulfite solution, the thus-separated product is filtered off, washed with water, and dried at 60° C. under vacuum. The thus-obtained crude product is purified by chromatography on silica gel, yielding 360 mg. of the butyl ester of 6α-fluoro - 9α - chloro-11β-hydroxy-3,20-dioxo - 16α - methyl - 1,4 - pregnadiene-21-oic acid, m.p. 180.5° C.

EXAMPLE 51

(a) 2.0 g. of the butyl ester of 6α-fluoro-9α-chloro-11β-hydroxy-3,20-dioxo - 16α - methyl-1,4-pregnadiene-21-oic acid is mixed with 50 ml. of butanol and 2.5 g. of potassium acetate, and the mixture is refluxed for 2 hours.

Then, the mixture is mixed, after cooling, with 100 ml. of chloroform, the chloroform phase is washed with water and concentrated to dryness under vacuum, thus producing 1.62 g. of the butyl ester of 6α-fluoro-9α-chloro-9,11β-epoxy-3,20 - dioxo - 16α-methyl-1,4-pregnadiene-21-oic acid as the crude product.

(b) The thus-obtained crude product is introduced into a mixture of 5.0 ml. of dimethylformamide and 5.0 ml. of anhydrous hydrofluoric acid which has been cooled to −50° C., and stored for 4 days at room temperature.

Thereafter, the mixture is poured into 500 ml. of 10% aqueous potassium bicarbonate solution, extracted with methylene chloride, the methylene chloride phase is concentrated under vacuum, and the residue is purified by chromatography over a silica gel column, thus obtaining 380 mg. of the butyl ester of 6α,9β-difluoro-11β-hydroxy-3,20-dioxo-16α-methyl-1,4-pregnadiene-21-oic acid.

EXAMPLE 52

0.5 g. of the butyl ester of 6α-fluoro-3,20-dioxo-16α-methyl-1,4,9(11)-pregnatriene-21-oic acid is introduced into a mixture, cooled to −50° C., of 1.0 ml. of anhydrous hydrofluoric acid, 1. 5ml. of tetrahydrofuran, and 2 ml. of methylene chloride; the mixture is mixed with 2.0 g. of N-chlorosuccinimide and allowed to stand for 16 hours at 0° C. Then, the reaction mixture is worked up as described in Example 51(b), thus obtaining 116 mg. of the butyl ester of 6α,11β-difluoro-9α-chloro-3,20-dioxo-16α-mtehyl-1,4 - pergnadiene-21-oic acid, m.p. 151° C.

EXAMPLE 53

3.0 g. of the methyl ester of 6α-fluoro-11β-hydroxy-3,20-dioxo-16α-methyl-1,4-pergnadiene-21-oic acid is dissolved in 200 ml. n-pentanol and mixed with 150 mg. of potassium tert.-butylate. The mixture is refluxed under an argon atmosphere for one hour.

The reaction product is precipitated with a solution of 1% acetic acid in water, and the precipitate is vacuum-filered, taken up in 100 ml. of methylene chloride, washed with saturated sodium bicarbonate solution and water, and the solution is dried with sodium sulfate and freed of the solvent under vacuum. The crude product is chromatographed on silica gel with acetone-hexane; after recrystallization from hexane-acetone 2.06 g. of the n-pentyl ester of 6α-fluoro-11β-hydroxy-3,20-dioxo-16α-methyl 1,4-pregnadiene-21-oic acid is obtained, m.p. 152–153° C. $[\alpha]_D^{25}$ +132° (chloroform).

EXAMPLE 54

1.5 g. of the methyl ester of 6α-fluoro-11β-hydroxy-3,20-dioxo-16α-methyl-1,4-pregnadiene-21-oic acid is reacted, as described in Example 53, with 2,2-dimethyl-propanol and worked up. The crude product is chromatographed on silica gel and recrystallized from acetone-hexane. 608 mg. of the 2,2-dimethyl-propyl ester of 6α-fluoro-11β-hydroxy-3,20-dioxo-16α - methyl - 1,4-pregnadiene-21-oic acid is obtained, m.p. 187–189° C. $[\alpha]_D^{25}$ +128° (chloroform).

EXAMPLE 55

2.0 g. of the methyl ester of 6α-fluoro-11β-hydroxy-3,20-dioxo-16α-methyl-1,4-pergnadiene-21-oic acid is reacted, as described in Example 53, with cyclopropyl-methyl-alcohol and worked up. The crude product is chromatographed on silica gel and recrystallized from acetone-hexane. 1.54 g. of the cyclopropyl-methyl ester of 6α-fluoro-11β-hydroxy - 3,20-dioxo - 16α-methyl-1,4-pregnadiene-21-oic acid is obtained. m.p. 192°–193° C. $[\alpha]_D^{25}$ +139° (chloroform).

EXAMPLE 56

1.0 g. of the methyl ester of 6α-fluoro-11β-hydroxy-3, 20-dioxo-16α-methyl-1,4-pregnadiene-21-oic acid is reacted, as described in Example 41, with (±)-2-methyl-butan-1-ol and worked up.

The crude product is chromatographed on silica gel, recrystallized from acetone-hexane and 448 mg. of the (±)-2-methyl-butyl ester of 6α-fluoro-11β-hydroxy-3,20-dioxo-16α-methyl-1,4-pregnadiene-21-oic acid is obtained. m.p. 177° C. $[\alpha]_D^{25}$ +136°.

EXAMPLE 57

(a) 107.0 g. of 9α-fluoro-11β,17α,21-trihydroxy-16α-methyl-1,4-pregnadiene-3,20-dione are dissloved in 2000 ml. of acetic acid and mixed with 10.0 g. of zinc acetate. The reaction mixture is refluxed for 4 hours. The reaction product is precipitated with water and the precipitate is vacuum-filtered. The crude product is taken up in methylene chloride, washed with saturated sodium bicarbonate solution and water, and the solution is dried with sodium sulfate and freed of the solvent under vacuum. 112.0 g. of a mixture of 9α-fluoro-11β,20-dihydroxy-3-oxo-16α - methyl-1,4,17(20) - pregnatriene-21-al and 9α-fluoro-11β-hydroxy-20-acetoxy-3-oxo-16α-methyl-1,4,17(20)-pregnatriene-21-al is obtained.

(b) 108.0 g. of the mixture of the aldehydes is dissolved in 300 ml. methanol and mixed with a solution of 15.0 g. potassium hydroxyde in 30 ml. of water. The reaction mixture is refluxed for 90 minutes under an argon atmosphere and concentrated under vacuum. The residue is acidified with 4n sulfuric acid, and extracted with methylene chloride. The organic phase is washed with saturated sodium bicarbonate solution and water, dried with sodium sulfate and freed from the solvent under vacuum, 52.0 g. of a mixture of 9α-fluoro-11β,20α$_F$-dihydroxy-3-oxo - 16α-methyl - 1,4-pregnadiene-21-oic acid and 9α-fluoro-11β-20β$_F$-dihydroxy-3-oxo-16α-methyl-1,4-pregnadiene-21-oic acid is obtained.

(c) 36.0 g. of the mixture of the carboxylic acids is dissolved in 200 ml. methanol cooled to 0° C. and 1000 ml. of an etheral diazomethane solution are added in several portions. The mixture is allowed to stand for one hour at room temperature, then acetic acid is added dropwise, until the yellow coloring has disappeared. Then the reaction mixture is evaporated under vacuum and the residue is chromatographed on silica gel. A mixture of methyl esters of 9α-fluoro-11β,20α$_F$-dihydroxy-3-oxo-16α-methyl-1,4-pregnadiene-21-oic acid and 9α-fluoro-11β,20β$_F$-dihydroxy - 3-oxo-16α-methyl - 1,4-pregnadiene-21-oic acid is obatined.

(d) 18.3 g. of the mixture of the methyl esters is reacted with manganese (IV) oxide under the conditions set forth in Example 1(b). The crude product is chromatographed on silica gel with acetone-hexane, after recrystallization from acetone-hexane 8.52 g. of the methyl ester of 9α-fluoro-11β-hydroxy-3,20-dioxo-16α-methyl-1,4-pregnadiene-21-oic acid is obtained. m.p. 216°–217° C. $[\alpha]_D^{25}$ +144° (chloroform).

EXAMPLE 58

1.87 g. of the methyl ester of 9α-fluoro-11β-hydroxy-3,20-dioxo-16α-methyl-1,4-pregnadiene-21-oic acid is converted as set forth in Example 26 to 430 mg. of the butyl ester of 9α-fluoro-11β-hydroxy-3,20-dioxo-16α-methyl-1,4-pregnadiene-21-oic acid. m.p. 162°–164° C. $[\alpha]_D^{25}$ +139° (chloroform).

EXAMPLE 59

25.0 g. 11β,17α,21-trihydroxy-1,4-pregnadiene-3,20-dione are converted as set forth in Example 57 (a to d) to 5.7 g. of the methyl ester of 11β-hydroxy-3,20-dioxo-1,4-pregnadiene-21-oic acid.

EXAMPLE 60

5.7 g. of the methyl ester of 11β-hydroxy-3,20-dioxo-1,4-pregnadiene-21-oic acid are reacted with ethanol as set forth in Example 24 and 2.09 g. of the ethyl ester of 11β-hydroxy-3,20-dioxo-1,4-pregnadiene-21-oic acid are obtained. m.p. 188°–189° C. $[\alpha]_D^{25}$+175° (chloroform).

EXAMPLE 61

(a) 20 g. of 6α-fluoro-11β,21-dihydroxy-16α-methyl-4-pregnene-3,20-dione are converted as set forth in Example 4(a) and a mixture of the butyl esters of 6α-fluoro-11β,20δ$_F$-dihydroxy-3-oxo-16α-methyl - 4 - pregnene-21-oic acid and 6α-fluoro-11β,20β$_F$-dihydroxy-3-oxo-16α-methyl-4-pregnene-21-oic acid is obtained.

(b) 15.3 g. of the mixture of the butyl esters is reacted with manganese (IV) oxide under the conditions as set forth in example 1(b) and 4.08 g. of the butylic ester of 6α-fluoro-11β-hydroxy-3,20-dioxo-16α-methyl-4-pregnene-21-oic acid is obtained. m.p. 188°

C.$[\alpha]_D^{25}$+176°
(chloroform).

EXAMPLE 62

(a) 7.0 g. 11β,21-dihydroxy-16α-methyl-1,4-pregnadiene-3,20-dione are converted as set forth in Example 4(b) and a mixture of the butyl esters of 11β,20α-dihydroxy-3-oxo-16α-methyl-1,4-pregnadiene-21-oic acid and 11β,20β-dihydroxy-3-oxo-16α-methyl - 1,4 - pregnadiene-21-oic acid is obtained.

(b) 5.8 g. of the mixture of the butyl esters is reacted with manganese (IV) oxide under the conditions as set forth in Example 1(b) and 2.88 g. of the butyl ester of 11β-hydroxy-3,20-dioxo-16α-methyl-1,4-pregnadiene-21-oic acid is obtained. m.p. 150° C. $[\alpha]_D^{25}$+151° (chloroform).

EXAMPLE 63

1.0 g. of the butyl ester of 6α-fluoro-11β-hydroxy-3,20-dioxo-16α-methyl-4-pregnene-21-oic acid is hydrolysed under the conditions as set forth in Example 3. The crude product is recrystallized from ethyl acetate at −30° C. and 453 mg. of 6α-fluoro-11β-hydroxy-3,20-dioxo-16α-methyl-4-pregnene-21-oic acid are obtained. m.p. 206°–209° C. $[\alpha]_D^{25}$+184° (pyridine).

EXAMPLE 64

390 mg. of 6α-fluoro-11β-hydroxy-3,20-dioxo-16α-methyl-1,4-pregnadiene-21-oic acid are dissolved in 50 ml. methanol and mixed with 10 ml. of an $\frac{1}{10}$ n NaOH solution in methanol. The mixture is then concentrated under vacuum and 100 ml. ether are added. The sodium salt is vacuum-filtered and dried under vacuum. Yield: 374 g. of the sodium salt of 6α-fluoro-11β-hydroxy-3,20-dioxo-16α-methyl-1,4-pregnadiene-21-oic acid.

EXAMPLE 65

1.0 g. of the methyl ester of 6α,11β-difluoro-9α-chloro-16α-methyl-3,20-dioxo-1,4-pregnadiene-21-oic acid is hydrolysed under the conditions as set forth in Example 3. The crude product is recrystallized from ethyl acetate. Yield: 380 mg. of 6α,11β-difluoro-9α-chloro-3,20-dioxo-16α-methyl-1,4-pregnadiene-21-oic acid. m.p. 270° C. (decomposition). $[\alpha]_D^{26}$+154° (pyridine).

EXAMPLE 66

750 mg. of the methyl ester of 6α-fluoro-2-chloro-11β-hydroxy-3,20-dioxo-16α-methyl - 1,4 - pregnadiene-21-oic acid is reacted with 30 ml. propanol and 50 mg. of potassium tert.-butylate as described in Example 24. The crude product is recrystallized from methylene chloride-diisopropyl ether and 351 mg. of the propyl ester of 6α-fluoro-2-chloro-11β-hydroxy-3,20-dioxo - 16α - methyl-1,4-pregnadiene-21-oic acid is obtained. m.p. 167° C. $[\alpha]_D^{25}$+107° (chloroform).

EXAMPLE 67

1.0 g. of the butyl ester of 6α-fluoro-11β-hydroxy-3,20-dioxo-16α-methyl-1,4-pregnadiene-21-oic acid is reacted as set forth in Example 43 with (±) methanol. The crude product is chromatographed on silica gel with hexane-acetone, recrystallized from methylene chloride-diisopropyl ether and 293 mg. of the (±) menthyl ester of 6α-fluoro-11β-hydroxy - 3,20 - dioxo-16α-methyl-1,4-pregnadiene-21-oic acid is obtained. m.p. 127°–140° C. $[\alpha]_D^{25}$+116° (chloroform).

EXAMPLE 68

1.0 g. of the butyl ester of 6α-fluoro-11β-hydroxy-3,20-dioxo-16α-methyl-1,4-pregnadiene-21-oic acid is reacted as set forth in Example 43 with (−) R-menthol. The crude product is chromatographed on silica gel with hexane-acetone and recrystallized from methylene chloride-diisopropyl ether. Yield: 522 mg. of the (−) R-menthyl ester of 6α-fluoro-11β-hydroxy-3,20-dioxo-16α-methyl - 1,4 - pregnadiene-21-oic acid. m.p. 137° C. $[\alpha]_D^{25}$+77° (chloroform).

EXAMPLE 69

1.0 g. of the butyl ester of 6α-fluoro-11β-hydroxy-3,20-dioxo-16α-methyl-1,4-pregnadiene-21-oic acid is dissolved in 20 ml. toluene, 10 g. (−)(1S)-borneol and 100 mg. potassium tert.-butylate are added and the mixture is heated to 110° C. for 20 hours. Then the reaction mixture is concentrated under vacuum, the residue is dissolved in methylene chloride, the organic phase is washed with sodium hydrogen carbonate solution and water and evaporated under vacuum. The crude product is chromatographed on silica gel with hexane-acetone, recrystallized from methylene chloride-diisopropyl ether and 464 mg. of the (—)(1S)-borneyl ester of 6α-fluoro-11β-hydroxy-3,20-dioxo-16α-methyl - 1,4 - pregnadiene-21-oic acid is obtained. m.p. 228° C. (decomposition). [α]$_D^{25}$+109° (chloroform).

EXAMPLE 70

1.0 g. of the butyl ester of 6α-fluoro-11β-hydroxy-3,20-dioxo-16α-methyl-1,4-pregnadiene-21-oic acid is reacted with (±) isoborneol as set forth in Example 69. The crude product is chromatographed on silica gel with hexane-acetone, recrystallized from hexane-acetone and 98 mg. of the (±) isoborneyl ester of 6α-fluoro-11β-hydroxy-3,20-dioxo-16α-methyl - 1,4 - pregnadiene-21-oic acid is obtained. m.p. 219° (decomposition). [α]$_D^{25}$+64° (chloroform).

EXAMPLE 71

1.0 g. of 6α-fluoro-11β-hydroxy-3,20-dioxo-16α-methyl-1,4-pregnadiene-21-oic acid is dissolved in 40 ml. tetrahydrofuran, 1 ml. dimethylformamide dineopentylacetal and 1 ml. (+)(S)-2-butanol are added and the mixture is allowed to stand for 16 days at room temperature. Then the mixture is diluted with methylene chloride washed with diluted hydrochloride acid, sodium hydrogen carbonate solution and water and evaporated under vacuum. The crude product is chromatographed on silica gel with hexane-acetone, recrystallized from methylene chloride-diisopropyl ether and 115 mg. of the (R)-2-butyl ester of 6α - fluoro - 11β - hydroxy-3,20-dioxo-16α-methyl-1,4-pregnadiene-21-oic acid is obtained. m.p. 214° C. [α]$_D^{25}$+130° (chloroform).

EXAMPLE 72

1.0 g. of 6α-fluoro-11β-hydroxy-3,20-dioxo-16α-methyl-1,4-pregnadiene-21-oic acid is dissolved in 15 ml. dimethylformamide, 0.7 g. dimethyl - formamide dineopentylacetal and 1 ml. (—)(R)-2-butanol are added and the mixture is reacted as set forth in Example 71. The crude product is recrystallized from methylene chloride-diisopropyl ether and 51 mg. of the (S)-2-butyl-ester of 6α-fluoro-11β-hydroxy-3,20-dioxo - 16α - methyl-1,4-pregnadiene-21-oic acid is obtained, m.p. 216° C. [α]$_D^{25}$ +118° (chloroform).

EXAMPLE 73

1.0 g. of butyl ester of 6α-fluoro-11β-hydroxy-3,20-dioxo-16α-methyl - 1,4 - pregnadiene - 21 - oic acid is dissolved in 10 ml. (+)(S)-2-octanol, 100 mg. potassium tert.-butylate are added and the mixture is heated for 10 minutes to 90° C. Then the octanol is distilled off under vacuum, the residue is dissolved in methylene chloride, the organic phase is washed dith sodium hydrogen carbonate solution and water and the solvent is evaporated under vacuum. The crude product is chromatographed on silica gel with hexane-acetone, recrystallized from methylene chloride-diisopropyl ether and 305 mg. of the (S)-2-octyl ester of 6α-fluoro-11β-hydroxy-3,20-dioxo-16α-methyl - 1,4 - pregnadiene-21-oic acid is obtained, m.p. 132° C. [α]$_D^{25}$ +127° (chloroform).

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. Compounds of the formula

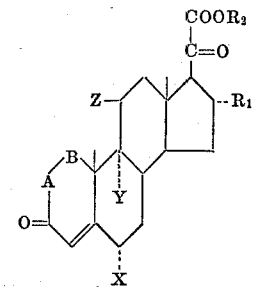

wherein X is hydrogen, halogen or methyl; Y is hydrogen or halogen; Z is hydroxy or halogen having an atomic weight no greater than Y; $R_1$ is hydrogen or methyl; $R_2$ is hydrogen, alkali-metal, or saturated or unsaturated hydrocarbon of 1–18 carbon atoms which is unsubstituted or substituted by up to 3 of hydroxy, halo, alkoxy, carboxy, carbalkoxy, amino, alkylamino, dialkylamino, nitro, sulfato and alkali-metal salts thereof wherein alkyl in each instance contains 1–4 carbon atoms; —A—B— is —CH=CH—, —CCl=CH— or, when at least one of X, Y and $R_1$ are other than hydrogen, —CH$_2$—CH$_2$; with the proviso that $R_1$ is hydrogen when X is fluoro, Y is hydrogen, Z is hydroxy, —A—B— is —CH=CH— and $R_2$ is hydrogen or ethyl.

2. A compound of Claim 1 wherein $R_2$ is alkyl of 1–12 carbon atoms.
3. A compound of Claim 1 wherein X is fluoro.
4. A compound of Claim 1 wherein Y is hydrogen.
5. A compound of Claim 1 wherein Z is hydroxy.
6. A compound of Claim 1 wherein —A—B— is —CH=CH—.
7. A compound of Claim 1 wherein $R_1$ is methyl.
8. A compound of Claim 7 wherein —A—B— is —CH=CH—.
9. A compound of Claim 8 wherein X is fluoro and Z is hydroxy.
10. A compound of Claim 9 wherein Y is hydrogen.
11. A compound of Claim 9 wherein $R_2$ is alkyl of 1–18 carbon atoms.
12. A compound of Claim 1, methyl ester of 6α-fluoro-11β - hydroxy-3,20-dioxo-16α-methyl - 1,4 - pregnadiene-21-oic acid.
13. A compound of Claim 1, butyl ester of 6α-fluoro-11β-hydroxy-3,20-dioxo - 16α - methyl - 1,4 - pregnadiene-21-oic acid.
14. A compound of Claim 1, isopropyl ester of 6α-fluoro - 11β - hydroxy-3,20-dioxo-16α-methyl-1,4-pregnadiene-21-oic acid.
15. A compound of Claim 1, 6α-fluoro-11β-hydroxy-3,20-dioxo-16α-methyl-1,4-pregnadiene-21-oic acid.
16. A compound of Claim 1, ethyl ester of 6α, 9α-difluoro-11β-hydroxy - 3,20 - dioxo-16α-methyl-1,4-pregnadiene-21-oic acid.
17. A compound of Claim 1, methyl ester of 6α-fluoro-9α-chloro - 11β - hydroxy-3,20-dioxo-16α-methyl - 1,4-pregnadiene-21-oic acid.
18. A compound of Claim 1, isobutyl ester of 6α-fluoro-9α-chloro - 11β - hydroxy-3,20-dioxo-16α-methyl - 1,4-pregnadiene-21-oic acid.
19. A compound of Claim 1, isopentyl ester of 6α-fluoro-11β-hydroxy-3,20-dioxo-16α-methyl - 1,4 - pregnadiene-21-oic acid.
20. A compound of Claim 1, methyl ester of 6α-fluoro-2-chloro-11β-hydroxy - 3,20 - dioxo-16α-methyl - 1,4-pregnadiene-21-oic acid.
21. A compound of Claim 1, tert.-butyl ester of 6α-fluoro-11β-hydroxy - 3,20 - dioxo-16α-methyl-1,4-pregnadiene-21-oic acid.

22. A compound of Claim 1, methyl ester of 6α-fluoro-9α,11β-dichloro - 3,20 - dioxo-16α-methyl-1,4-pregnadiene-21-oic acid.

23. A compound of Claim 1, methyl ester of 6α,11β-difluoro-9α-chloro - 3,20 - dioxo-16a-methyl-1,4-pregnadiene-21-oic acid.

24. A compound of Claim 1, cyclohexyl ester of 11β-hydroxy-3,20-dioxo-6a,16a-dimethyl - 1,4 - pregnadiene-21-oic acid.

25. A compound of Claim 1, ethyl ester of 6α-fluoro-11β-3,20-dioxo-16α-methyl-1,4-pregnadiene-21-oic acid.

26. A compound of Claim 1, butyl ester of 6α,11β-difluoro-9α-chloro - 3,20 - dioxo-16α-methyl-1,4-pregnadiene-21-oic acid.

27. A compound of Claim 1, propyl ester of 6α-fluoro-11β-hydroxy - 3,20 - dioxo-16α-methyl-1,4-pregnadiene-21-oic acid.

28. A compound of Claim 1, sec.-butyl ester of 6α-fluoro-11β-hydroxy - 3,20 - dioxo-16α-methyl-1,4-pregnadiene-21-oic acid.

29. A compound of Claim 1, pentyl ester of 6α-fluoro-11β-hydroxy - 3,20 - dioxo-16α-methyl-1,4-pregnadiene-21-oic acid.

30. A compound of Claim 1, isobutyl ester of 6α-fluoro-11β-hydroxy - 3,20 - dioxo-16α-methyl-1,4-pregnadiene-21-oic acid.

31. A compound of Claim 1, butyl ester of 6α-fluoro-9α,11β-dichloro-3,20 - dioxo - 16α-methyl-1,4-pregnadiene-21-oic acid.

32. A compound of Claim 1, decyl ester of 6α-fluoro-11β-hydroxy - 3,20 - dioxo-16α-methyl-1,4-pregnadiene-21-oic acid.

33. A compound of Claim 1, butyl ester of 6α-fluoro-9α - chloro - 11β - hydroxy-3,20-dioxo-16α-methyl-1,4-pregnadiene-21-oic acid.

34. A compound of Claim 1, 2'-propenyl ester of 6α-fluoro-11β - hydroxy - 3,20-dioxo-16α-methyl-1,4-pregnadiene-21-oic acid.

35. A compound of Claim 1, 2'-methoxyethyl ester of 6α-fluoro-11β - hydroxy - 3,20-dioxo-16α-methyl - 1,4-pregnadiene-21-oic acid.

36. A compound of Claim 1, methyl ester of 6α,9α-difluoro - 11β - hydroxy-3,20-dioxo-16α-methyl-1,4-pregnadiene-21-oic acid.

37. A compound of Claim 1, butyl ester of 6α,9α-difluoro - 11β - hydroxy-3,20-dioxo-16α-methyl-1,4-pregnadiene-21-oic acid.

38. A compound of Claim 1, octyl ester of 6α-fluoro-11β-hydroxy - 3,20 - dioxo-16α-methyl-1,4-pregnadiene-21-oic acid.

39. A compound of Claim 1, 2'-propynyl ester of 6-fluoro-11β-hydroxy - 3,20 - dioxo-16α-methyl-1,4-pregnadiene-21-oic acid.

40. A compound of Claim 1, benzyl ester of 6α-fluoro-11β-hydroxy - 3,20 - dioxo-16α-methyl-1,4-pregnadiene-21-oic acid.

41. A compound of Claim 1, 2'-methylbutyl ester of 6α-fluoro - 11β-hydroxy-3,20-dioxo-16α-methyl-1,4-pregnadiene-21-oic acid.

42. A compound of Claim 1, 3'-hydroxypropyl ester of 6α-fluoro-11β-hydroxy -3,20 - dioxo-16α-methyl-1,4-pregnadiene-21-oic acid.

43. A compound of Claim 1, menthyl ester of 6α-fluoro-2-chloro-11β-hydroxy - 3,20 - dioxo-16α-methyl-1,4-pregnadiene-21-oic acid.

44. A compound of Claim 1, hexyl ester of 6α-fluoro-11β-hydroxy - 3,20 - dioxo-16α-methyl-1,4-pregnadiene-21-oic acid.

45. A compound of Claim 1, cyclohexyl ester of 6α-fluoro-11β-hydroxy - 3,20 - dioxo-16α-methyl-1,4-pregnadiene-21-oic acid.

46. A compound of claim 1, 2,2-dimethyl-propyl ester of 6α-fluoro-11β-hydroxy - 3,20 - dioxo-16α-methyl-1,4-pregnadiene-21-oic acid.

47. A compound of claim 1, cyclopropyl-methyl ester of 6α-fluoro-11β-hydroxy - 3,20 -dioxo-16α-methyl-1,4-pregnadiene-21-oic acid.

48. A compound of claim 1, methyl ester of 9α-fluoro-11β-hydroxy - 3,20 - dioxo-16α-methyl-1,4-pregnadiene-21-oic acid.

49. A compound of claim 1, butyl ester of 9α-fluoro-11β-hydroxy - 3,20 - dioxo-16α-methyl-1,4-pregnadiene-21-oic acid.

50. A compound of claim 1, methyl ester of 11β-hydroxy-3,20-dioxo-1,4-pregnadiene-21-oic acid.

51. A compound of claim 1, ethyl ester of 11β-hydroxy-3,20-dioxo-1,4-pregnadiene-21-oic acid.

52. A compound of claim 1, butyl ester of 6α-fluoro-11β-hydroxy - 3,20 - dioxo-16α-methyl-1,4-pregnadiene-21-oic acid.

53. A compound of claim 1, butyl ester of 11β-hydroxy-3,20-dioxo-16α-methyl-1,4-pregnadiene-21-oic acid.

54. A compound of claim 1, 6α-fluoro-11β-hydroxy-3,20-dioxo-16α-methyl-4-pregnene-21-oic acid.

55. A compound of claim 1, sodium salt of 6α-fluoro-11β-hydroxy - 3,20 - dioxo-16α-methyl-1,4-pregnadiene-21-oic acid.

56. A compound of claim 1, 6α,11β-difluoro-9α-chloro-3,20-dioxo-16α-methyl-1,4-pregnadiene-21-oic acid.

57. A compound of claim 1, propyl ester of 6α-fluoro-2-chloro-11β-hydroxy - 3,20 - dioxo-16α-methyl-1,4-pregnadiene-21-oic acid.

58. A compound of claim 1, menthyl ester of 6α-fluoro-11β-hydroxy - 3,20 - dioxo-16α-methyl-1,4-pregnadiene-21-oic acid.

59. A compound of claim 1, bornyl ester of 6α-fluoro-11β-hydroxy - 3,20 - dioxo-16α-methyl-1,4-pregnadiene-21-oic acid.

60. A compound of claim 1, isobornyl ester of 6α-fluoro-11β-hydroxy - 3,20 - dioxo-16α-methyl-1,4-pregnadiene-21-oic acid.

61. A compound of claim 1, 2-butyl ester of 6α-fluoro-11β-hydroxy - 3,20 - dioxo-16α-methyl-1,4-pregnadiene-21-oic acid.

62. A compound of claim 1, 2-octyl ester of 6α-fluoro-11β-hydroxy - 3,20 - dioxo-16α-methyl-1,4-pregnadiene-21-oic acid.

References Cited

UNITED STATES PATENTS

| | | | |
|---|---|---|---|
| 2,752,366 | 6/1956 | Hogg et al. | 260—397.1 |
| 3,169,131 | 2/1965 | Kagan et al. | 260—397.1 |
| 3,328,439 | 6/1967 | Hamilton | 260—410.9 |
| 3,281,415 | 10/1966 | Schneider et al. | 260—239.55 |

HENRY A. FRENCH, Primary Examiner

U.S. Cl. X.R.

424—243

UNITED STATES PATENT OFFICE
CERTIFICATE OF CORRECTION

Patent No. 3,824,260　　　　　　　　Dated　July 16, 1974

Inventor(s)　Henry Laurent, et al.

It is certified that error appears in the above-identified patent and that said Letters Patent are hereby corrected as shown below:

IN THE HEADING, COLUMN 1, THE CLAIM OF PRIORITY SHOULD READ:

- Germany, October 4, 1971, P 21 50 268.1; Jan. 27, 1972, P 22 04 358.9, P 22 04 360.3 and P 22 04 361.4 --

IN THE CLAIMS:

CLAIM 11, COLUMN 26, SECOND LINE OF THE CLAIM:

"1-18" should read -- 1-8 --.

CLAIM 25, COLUMN 27, SECOND LINE OF THE CLAIM:

After "11β-", insert -- hydroxy- --.

CLAIM 52, COLUMN 28, SECOND LINE OF THE CLAIM:

"methyl-1,4-pregnadiene" should read -- methyl-4-pregnene --.

Signed and sealed this 8th day of October 1974.

(SEAL)
Attest:

McCOY M. GIBSON JR.
Attesting Officer

C. MARSHALL DANN
Commissioner of Patents